US012742967B2

(12) United States Patent
DeVine et al.

(10) Patent No.: US 12,742,967 B2
(45) Date of Patent: Sep. 22, 2026

(54) INCORPORATING COMPONENTS INSIDE OPTICAL STACKS OF HEADMOUNTED DEVICES

(71) Applicant: Dolby Laboratories Licensing Corporation, San Francisco, CA (US)

(72) Inventors: Titus Marc DeVine, Shingle Springs, CA (US); Chun Chi Wan, Campbell, CA (US); Chaitanya Atluru, San Jose, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 959 days.

(21) Appl. No.: 17/278,010

(22) PCT Filed: Sep. 20, 2019

(86) PCT No.: PCT/US2019/052292

§ 371 (c)(1),
(2) Date: Mar. 19, 2021

(87) PCT Pub. No.: WO2020/061541

PCT Pub. Date: Mar. 26, 2020

(65) Prior Publication Data

US 2021/0373340 A1 Dec. 2, 2021

Related U.S. Application Data

(60) Provisional application No. 62/779,210, filed on Dec. 13, 2018, provisional application No. 62/734,781, filed on Sep. 21, 2018.

(51) Int. Cl.

| | |
|---|---|
| ***G02B 27/01*** | (2006.01) |
| ***F21V 8/00*** | (2006.01) |
| ***G02B 27/00*** | (2006.01) |

(52) U.S. Cl.
CPC ....... *G02B 27/0172* (2013.01); *G02B 6/0076* (2013.01); *G02B 27/0093* (2013.01);
(Continued)

(58) Field of Classification Search
CPC .............. G02B 27/017; G02B 27/0172; G02B 2027/0174; G02B 27/0176; G02B 2027/0178; G02B 27/0093
See application file for complete search history.

(56) References Cited

U.S. PATENT DOCUMENTS

| | | | | |
|---|---|---|---|---|
| 6,437,925 B1 * | 8/2002 | Nishioka | ............. | G02B 26/085 359/290 |
| 6,464,363 B1 * | 10/2002 | Nishioka | ............. | G02B 17/086 359/224.1 |

(Continued)

FOREIGN PATENT DOCUMENTS

| | | |
|---|---|---|
| CN | 103261943 B | 8/2013 |
| CN | 108351527 A | 7/2018 |

(Continued)

*Primary Examiner* — Bao-Luan Q Le

(57) ABSTRACT

A wearable device includes circuitry on substrate. The substrate is coupled to an optical element in an optical stack. A refractive index of the substrate perceptually matches a refractive index of the optical component. The circuitry is imperceptible to the viewer wearing the device, despite that the circuitry has a view of (or, as an example, an unobstructed line of sight to) the viewer's eye. The circuitry can include a camera or an emitter, or both. The camera captures one or more reflections of the emitter from the viewer's eye. In a specific embodiment, the substrate includes a waveguide, Fresnel lenses, or lens to bend light rays around from the circuitry to achieve the imperceptibility. In alternative embodiment, the circuitry can be a piezoelectric device, liquid crystal controller, or any electronic circuitry relevant for a wearable device.

21 Claims, 8 Drawing Sheets

(52) U.S. Cl.
CPC ................ *G02B 2027/0178* (2013.01); *G02B 2027/0187* (2013.01)

(56) References Cited

U.S. PATENT DOCUMENTS 6,738,199 B2 * 5/2004 Nishioka ................ H04N 23/55 359/291
6,865,009 B2 * 3/2005 Nishioka ............ G02B 17/0816 359/846
7,088,520 B2 * 8/2006 Nishioka ............ G02B 26/0858 348/240.99
7,091,469 B2 8/2006 Kossives
8,220,926 B2 * 7/2012 Blixt ....................... G06F 3/013 351/209
8,274,051 B1 9/2012 Aswell
8,339,446 B2 * 12/2012 Blixt .................... A61B 3/0008 348/78
8,342,687 B2 * 1/2013 Blixt ...................... G03B 15/16 351/209
8,567,955 B2 10/2013 Amm
8,582,209 B1 * 11/2013 Amirparviz .......... G02B 27/147 359/630
8,929,589 B2 * 1/2015 Publicover ............. H04N 23/90 382/103
8,985,810 B2 3/2015 Woodgate
9,057,826 B2 * 6/2015 Gupta .................... G02C 7/086
9,366,869 B2 * 6/2016 Martinez ............ G02B 27/0172
9,390,326 B2 * 7/2016 Publicover ............. G06F 3/013
9,733,479 B2 * 8/2017 Schmidt ................... G02B 5/09
9,748,631 B2 8/2017 Etzkorn
9,759,913 B2 * 9/2017 Saarikko .............. H04N 13/383
9,835,866 B2 * 12/2017 Widulle ................... G02B 5/10
9,897,811 B2 * 2/2018 Martinez ................ G02B 27/01
9,964,767 B2 * 5/2018 Son ....................... G06F 3/1446
10,025,379 B2 * 7/2018 Drake ...................... A61B 3/14
10,032,074 B2 * 7/2018 Publicover ............. H04N 23/90
10,039,447 B2 8/2018 Barrows
10,126,568 B2 * 11/2018 Rousseau ............. G02B 6/0011
10,162,180 B2 * 12/2018 Cakmakci .............. H04N 23/20
10,247,962 B2 * 4/2019 Rousseau ............... G02C 7/027
10,345,589 B1 * 7/2019 Son .......................... G02B 5/30
10,509,235 B2 * 12/2019 Fricker .............. G02B 27/0012
10,514,542 B2 * 12/2019 Erinjippurath ..... G02B 27/0172
10,520,731 B2 * 12/2019 Amitai ............... G02B 27/0172
10,690,941 B2 * 6/2020 Puetz ..................... G02C 7/086
10,739,851 B2 * 8/2020 Hainzl ............... G02B 27/0093
10,788,892 B2 * 9/2020 Sharma ................. G06F 3/0308
11,372,250 B2 * 6/2022 Lien ................... G02B 27/0176
11,455,031 B1 * 9/2022 Sharma ................... G06F 3/013
2002/0181126 A1 * 12/2002 Nishioka ................... G02F 1/29 359/726
2004/0179280 A1 * 9/2004 Nishioka ............ G02B 13/0075 359/846
2005/0157409 A1 * 7/2005 Nishioka ............ G02B 17/0848 359/726
2006/0092644 A1 5/2006 Mok
2010/0328444 A1 * 12/2010 Blixt ....................... A61B 3/145 348/78
2011/0069277 A1 * 3/2011 Blixt ....................... G01S 17/46 349/61
2011/0085139 A1 * 4/2011 Blixt ...................... A61B 3/113 351/209
2013/0114850 A1 * 5/2013 Publicover ........... A61B 3/0025 382/103
2014/0146243 A1 * 5/2014 Liu .................... G02B 27/0176 381/151
2014/0184775 A1 * 7/2014 Drake .................... G03B 17/38 348/78
2014/0211146 A1 * 7/2014 Gupta .................... G02C 7/086 351/158
2015/0002374 A1 * 1/2015 Erinjippurath .......... G06T 15/08 345/8
2015/0205123 A1 7/2015 Border
2015/0220779 A1 * 8/2015 Publicover ............. G06F 3/013 348/78
2015/0323795 A1 11/2015 Alton
2016/0131907 A1 * 5/2016 Martinez ............ G02B 17/0832 359/633
2016/0161743 A1 6/2016 Osterhout
2016/0282621 A1 * 9/2016 Widulle ................... G02B 5/10
2016/0313557 A1 * 10/2016 Schmidt ............. G02B 27/0172
2016/0357016 A1 * 12/2016 Cakmakci .......... G02B 27/0172
2016/0370583 A1 * 12/2016 Saarikko .................. G02B 6/34
2017/0017095 A1 * 1/2017 Fricker .................. G02C 7/086
2017/0116476 A1 * 4/2017 Publicover ............. H04N 23/56
2017/0192250 A1 * 7/2017 Rousseau ............... G02C 7/027
2017/0255011 A1 * 9/2017 Son ...................... G02B 5/3025
2017/0287112 A1 10/2017 Stafford
2017/0293143 A1 * 10/2017 Martinez ............ G02B 27/0172
2017/0336636 A1 * 11/2017 Amitai ............... G02B 27/0172
2017/0351117 A1 * 12/2017 Rousseau ............. G02B 6/0011
2018/0035101 A1 2/2018 Osterhout
2018/0120573 A1 5/2018 Ninan
2018/0239146 A1 8/2018 Bierhuizen
2018/0259792 A1 * 9/2018 Puetz ....................... G02B 3/08
2018/0295351 A1 10/2018 Ninan
2018/0364482 A1 * 12/2018 Georgiou ........... G02B 27/0101
2019/0025930 A1 * 1/2019 Fransson ................ G02C 7/022
2019/0155380 A1 5/2019 Jia
2019/0163267 A1 * 5/2019 Hainzl ................. G02B 27/017
2019/0278086 A1 * 9/2019 Ofir ......................... G02B 6/122
2019/0293939 A1 * 9/2019 Sluka ................. G02B 27/0172
2019/0361523 A1 * 11/2019 Sharma ............. G02B 27/0093
2020/0388077 A1 12/2020 Ninan
2021/0096373 A1 * 4/2021 Lien ................... G02B 27/0176

FOREIGN PATENT DOCUMENTS

WO 2010114834 10/2010
WO 2011124897 10/2011
WO 2015109145 7/2015

* cited by examiner

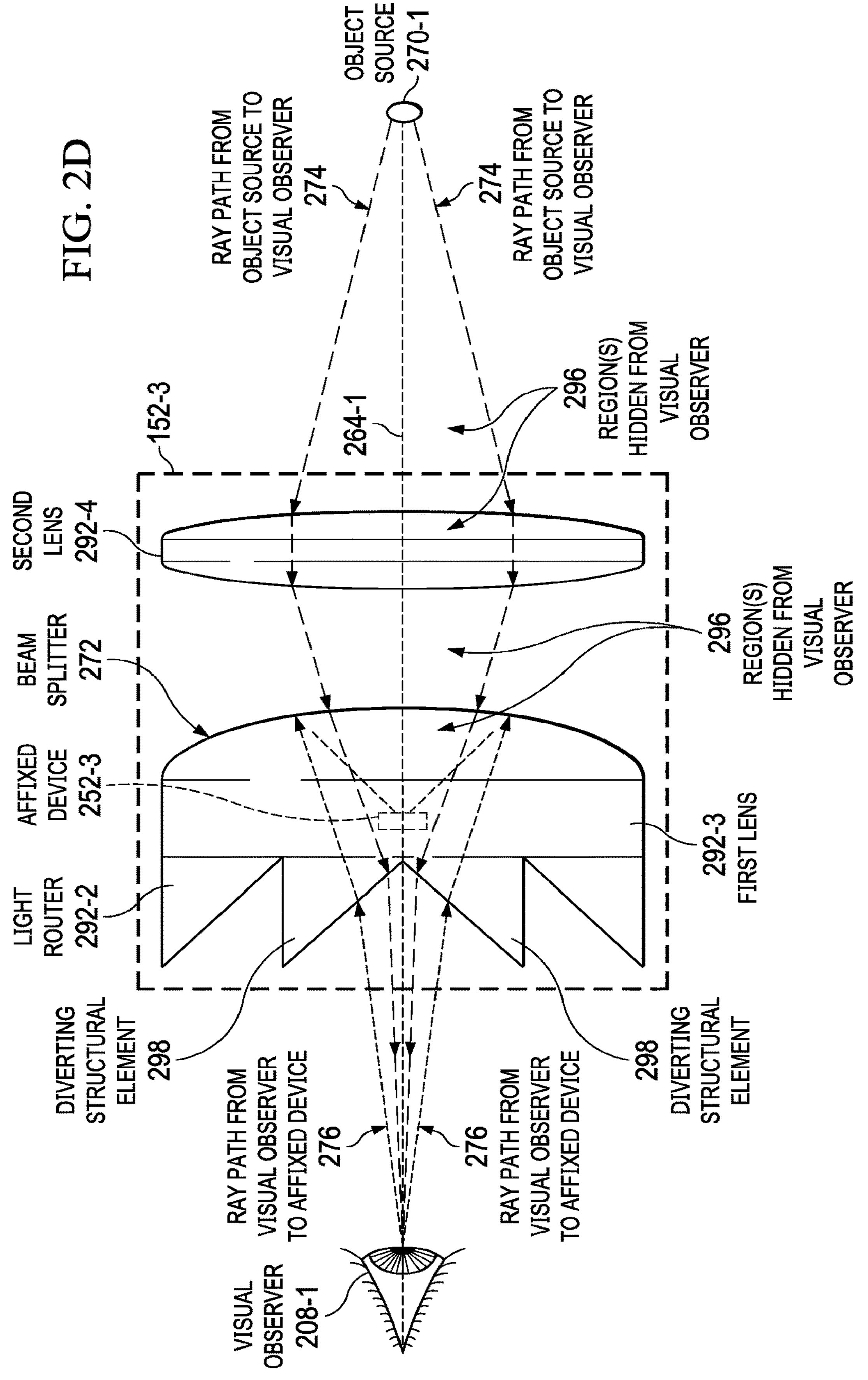
FIG. 2D
OBJECT SOURCE 270-1
RAY PATH FROM OBJECT SOURCE TO VISUAL OBSERVER 274
RAY PATH FROM OBJECT SOURCE TO VISUAL OBSERVER 274
152-3
264-1
296 REGION(S) HIDDEN FROM VISUAL OBSERVER
296 REGION(S) HIDDEN FROM VISUAL OBSERVER
SECOND LENS 292-4
BEAM SPLITTER 272
AFFIXED DEVICE 252-3
LIGHT ROUTER 292-2
292-3 FIRST LENS
DIVERTING STRUCTURAL ELEMENT 298
298 DIVERTING STRUCTURAL ELEMENT
RAY PATH FROM VISUAL OBSERVER TO AFFIXED DEVICE 276
276 RAY PATH FROM VISUAL OBSERVER TO AFFIXED DEVICE
VISUAL OBSERVER 208-1

INCORPORATING COMPONENTS INSIDE OPTICAL STACKS OF HEADMOUNTED DEVICES

CROSS-REFERENCE TO RELATED APPLICATIONS

This application claims the benefit of priority to U.S. Provisional Patent Application No. 62/734,781, filed Sep. 21, 2018, and to U.S. Provisional Patent Application No. 62/779,210, filed Dec. 13, 2018, both of which are hereby incorporated by reference in their entirety.

TECHNOLOGY

The present invention relates generally to entertainment systems, and in particular, to headmounted/wearable devices.

BACKGROUND

One of the main problems of placing electronic and/or non-electronic components that have very different optical properties than surrounding optical elements is that these components can become easily visible distractions/artifacts to the eyes. For example, an electronic and/or non-electronic component may be placed in a cavity that is bored out of an optical element such as a concave lens. Alternatively, the component may be directly attached to the outer surface of, or otherwise mounted on, the optical element in some manner Drilling holes or cavities in optical elements would disturb integrity of the optical elements, create microcracks in the optical elements, and induce extraneous reflective lights from surface areas separating the optical elements from the holes/cavities. Attaching electronic and/or non-electronic components to outer surfaces of optical elements would create airgaps between the attached components and the optical elements. As the optical elements and the airgaps between the components and the optical elements can have very different refractive indexes, extraneous reflections and refractions occurring at media interfaces/transitions cause these components or their presences (e.g., as would be indicated by shadows, light sparks, light flashes, light reflections, light occlusions, etc., caused by some or all of the components; as would be indicated by an opaque or low-optical transmission screen placed in front of some or all of these components, etc.) easily noticeable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2D illustrate example optical stacks;

DESCRIPTION OF EXAMPLE EMBODIMENTS

Figure 1:
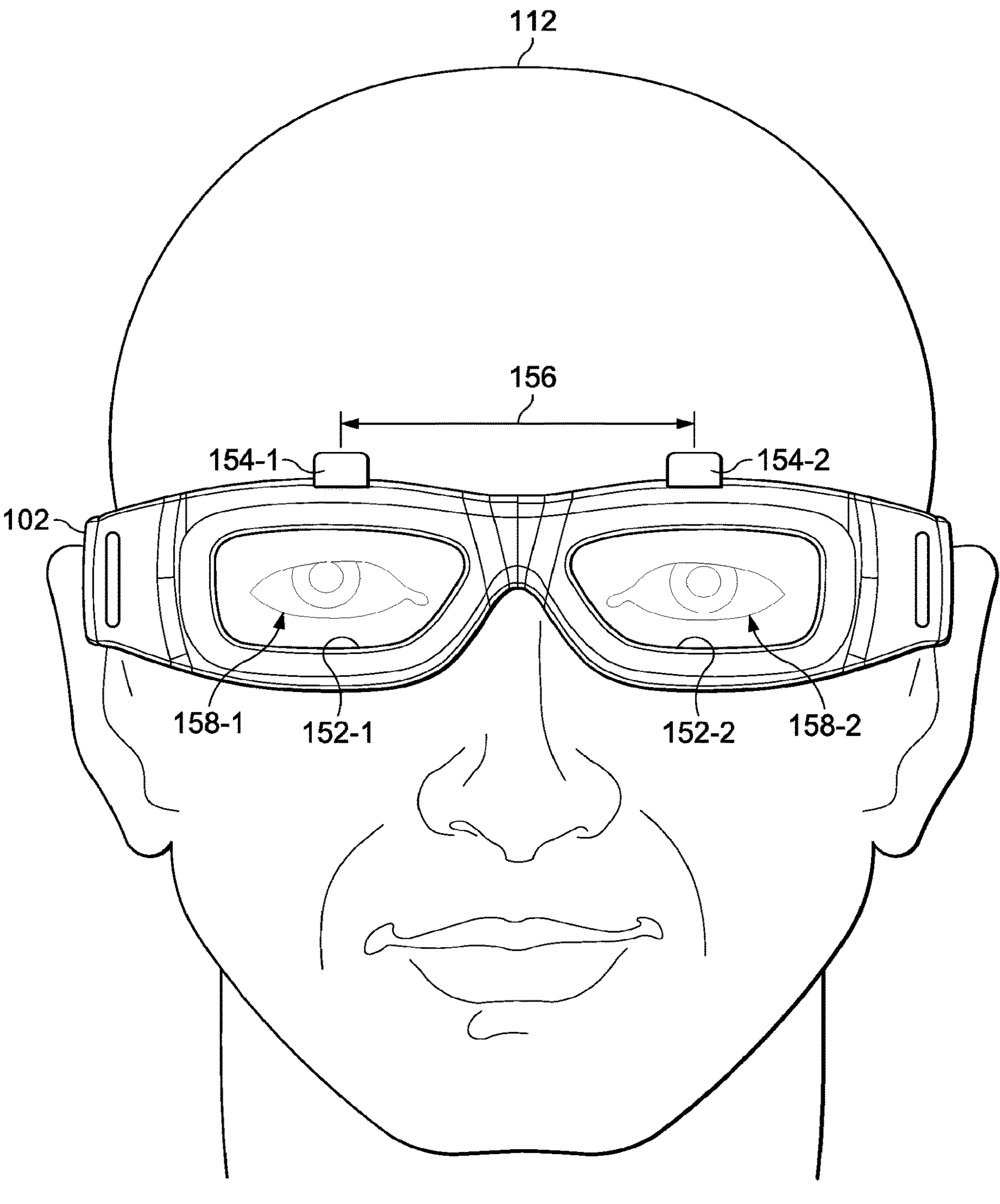
FIG. 1 illustrates an example wearable device.

Example embodiments, which relate to incorporating components inside optical stacks, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. WEARABLE DEVICES
3. EMBEDDING DEVICES INTO OPTICAL STACKS
4. AUGMENTED ENTERTAINMENT SYSTEMS
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to place electronic and/or non-electronic components in an optical stack of a viewer's wearable device along an (e.g., imaginary, actual, etc.) optical path/axis representing a viewer's expected view direction as well as off from the optical path/axis. A device receptacle (or hiding) spatial region—in the form of a hole, spatial cavity, hollowed-out space/shape, and so forth—may be bored or created in one of optical elements and/or substrates in the optical stack. An embedded device, or some or all electronic and/or non-electronic components therein, may be embedded, affixed and/or hidden inside the receptacle spatial region of the optical stack.

The receptacle region may be placed or located in the front portion of an optical element facing the viewer to enable the embedded device to perform eye tracking of the viewer's eye(s). The receptacle region may be placed or located in the back portion of an optical element facing the outside world to enable the embedded device to visually track visual objects (or object sources), scenes, backgrounds, etc., as being viewed by the viewer through the optical stack, for example in an augmented-reality (AR) application, a virtual-reality (VR) application, etc. Additionally, optionally or alternatively, the receptacle region may be placed or located in both front and back portions of an optical element to enable various embedded device applications.

The embedded device may be affixed or molded with little airgap into a substrate made of molding materials with a refractive index matching that of optical element(s) in physical contact such as lenses in the optical stack. Additionally, optionally or alternatively, light routers such as Fresnel structures, grating structures, and so forth, can be used to prevent light emitted or reflected off from the embedded device or the receptacle region from reaching a visual observer.

The substrate may be of any spatial shape in a wide variety of spatial shapes and may be made of any molding materials in a wide variety of molding materials (including but not limited to gel materials) to hold or mechanically secure some or all of the embedded device firmly in designated positions/orientations in or off the optical path of the optical stack. As the substrate may be made of a selected molding material with a refractive index that matches (e.g., with a specific refractive index tolerance, etc.) the refractive index of the optical element in physical contact with the substrate, extraneous reflections or refractions such as specular reflections, light flashes/sparks, etc., from a physical boundary separating the optical element from the substrate can be prevented or minimized under techniques as described herein.

Example embodiments include molding or affixing electronic and/or non-electronic components such as light emitting diodes (LEDs), nanowires, ITO conductive materials or other electronic and/or non-electronic components on or between (e.g., optical, transparent, etc.) substrates. This can be done with molding materials such as polydimethylsiloxane (PDMS) materials, refractive index matching epoxy materials, etc.

A molding/affixing step as described herein can be performed before, after, or at the same time as, processing/assembling optical components in an embedded device.

Techniques as described herein can be implemented to remove or significantly reduce glares, shadowing, diffractions, extraneous reflections, extraneous refractions, etc., of light emitted or reflected off from electronic and/or non-electronic components—which may or may not be of the same optical properties as those of the optical components, optical elements, lenses, substrates, etc.—through some or all of the optical components, optical elements, lenses, substrates, etc. to the viewer's eye(s) or camera.

For example, some or all of an embedded device may be placed along and/or off an (e.g., imaginary, actual, etc.) optical path/axis representing the viewer's expected view direction. A problem of placing electronic or non-electronic components (which are likely to have divergent optical properties from some or all optical elements of an optical stack) of the embedded device in the optical stack is that these components can become easily visible to the viewer's eye(s), which is a distraction relative to what the viewer intends to see with the optical stack.

Techniques as described herein can be used to hide, or reduce likelihood of visually perceiving, embedded components, at the same time while some or all of the embedded components can see a clear picture of the viewer's eye(s) and/or the outside world presented or viewable by way of the viewer's wearable device.

For example, sensors, emitters, cameras, etc., can be placed in the optical path(s) of optical stack(s) of the viewer's wearable device to observe the viewer's eye(s) while being kept invisible to the viewer's eye(s). This may be done by bending light rays around the embedded components. Bending light rays can be achieved by incorporating specifically designed light waveguides, Fresnel lenses, or other optical techniques.

Techniques as described herein can be used to further engineer or implement attendant features/components such as data communication links, power connections, electrical paths, etc., to or from the embedded components. Some or all of these attendant components may be hidden and embedded in the optical stacks of the wearable device and may be kept invisible to the viewer's eye(s). Various ways of achieving this may be used. For example, optically transparent (or see-through) indium tin oxide (ITO) conductive materials may be used to provide electric and/or power connections to some or all of the embedded components. Additionally, optionally or alternatively, relatively tiny sized (e.g., comparable to or smaller than a diameter of a human hair, etc.) electric connections such as nanowires, nanotubes, etc., may be engineered or implemented in one or more substrates (e.g., gel, glass, epoxy, etc.) used to embed, affix and/or hide the electronic and/or non-electronic components in the optical stacks of the wearable device.

Example embodiments includes wearable devices that can be used, for example, with an augmented entertainment system. Visual access to the viewer's eye allows an embedded device to detect positions, orientations, gaze tracking, movements of the viewer's eye or the eye's pupil. The embedded device can be used for layered augmented entertainment experiences, as described in U.S. Provisional Patent Application Ser. No. 62/484,121, filed on Apr. 11, 2017, the entire contents of which are hereby incorporated by reference as if fully set forth herein. Example augmented 3D entertainment systems are described in U.S. patent application Ser. No. 15/945,237, filed on Apr. 4, 2018, the entire contents of which are hereby incorporated by reference as if fully set forth herein.

The embedded device can include, but is not necessarily limited to only, any of:

cameras, light emitters, etc. As an example, the embedded device can implement slippage compensation in eye tracking described in U.S. Provisional Patent Application Ser. No. 62/588,247, filed Nov. 17, 2017, the entire contents of which are hereby incorporated by reference as if fully set forth herein. Additionally, optionally or alternatively, the embedded device can provide other system/device functions, including but not necessarily limited to only, altering a refractive index of an optical element in an optical path, altering a focal length of a lens, etc.

Example embodiments described herein relate to wearable devices used with an augmented entertainment system. A wearable device for a viewer comprises: a first view optical stack comprising one or more optical elements through which the viewer's first eye views one or more objects located at one or more distances from the viewer's first eye; a substrate in physical contact with an optical element in the one or more optical elements of the first view optical stack, the substrate's optical refractive index matching the optical element's refractive index; an embedded device affixed to the substrate.

Example embodiments described herein relate to methods for providing wearable devices. A substrate is placed in physical contact with an optical element in one or more optical elements of a first view optical stack, the substrate's optical refractive index matching the optical element's refractive index. An embedded device is affixed to the substrate. The first view optical stack is incorporated into a wearable device through which a viewer's first eye views one or more objects located at one or more distances from the viewer's first eye.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Wearable Devices

FIG. 1 illustrates an example wearable device 102 that comprises a left view optical stack 102-2, a right view optical stack 102-1, a left view imager 154-2, a right view imager 154-1, etc. Some or all of the components/devices as depicted in FIG. 1 may be implemented by one or more mechanical components, one or more electrooptical components, one or more computing devices, modules, units, etc., in software, hardware, a combination of software and hardware, etc. Some or all of the components/devices as depicted in FIG. 1 may be communicatively (e.g., wirelessly, with wired connections, etc.) coupled with some other components/devices as depicted in FIG. 1 or with other components/devices not depicted in FIG. 1.

In some embodiments, the wearable device (102) is worn or mounted on the head of the viewer (112). The wearable device (102) may include one or more of: an eyeglasses frame, a face shield, a helmet, a strap attachment, etc. By way of example but not limitation, an eyeglass frame is used to (e.g., removably, irremovably, etc.) fit the left view optical stack (152-2) and the right view optical stack (152-1) in front of the left eye (158-2) and the right eye (158-1) of the viewer (112), respectively. The eyeglass frame is further used to (e.g., removably, irremovably, etc.) attach or mount the left view imager (154-2) and the right view imager (152-1), for example, on a top rim of the eyeglass frame. The eyeglass frame may be personalized to an individual viewer or may be of a generic size designed to be worn or mounted by a relatively large population of viewers (e.g., full size, a size for kids, etc.).

The left view optical stack (152-2) can be used by the viewer (112) of the wearable device (102) to see or visually perceive a left view of real-life objects in a physical environment or left view images of stereoscopic (or even non-stereoscopic) images rendered on an external display (e.g., 258 of FIG. 2A through FIG. 2C, etc.) that is external to the wearable device (102). The right view optical stack (152-1) can be used by the viewer (112) of the wearable device (102) to see or visually perceive a right view of the real-life objects in the physical environment or right view images of the stereoscopic images rendered on the external display. The left view of the real-life objects or the left view images of the stereoscopic images as viewed by the viewer (112) through the left view optical stack (152-2) and the right view of the real-life objects or the right view images of the stereoscopic images as viewed by the viewer (112) through the right view optical stack (152-1) form a stereoscopic view of the real-life objects or the stereoscope images.

The left view imager (154-2) can be used by the viewer (112) to view left view device display images rendered with the left view imager (154-2). The right view imager (154-1) can be used by the viewer (112) to view right view device display images rendered with the right view imager (154-1). The left view device display images as viewed by the viewer (112) and the right view device display images as viewed by the viewer (112) form stereoscopic device images complementary to the stereo view of the real-life objects in the physical environment or the stereoscopic images rendered on the external display.

In some embodiments, neither the left-view imager (154-2) nor the right-view imager (154-1) renders images on a physical display, but rather renders images virtually on an image plane or a virtual display created by light rays emitted by the left view imager (154-2) and the right view imager (154-1). More specifically, the left view imager (154-2) emits left view light rays that reach the left eye (158-2) of the viewer (112) to allow the viewer (112) to visually perceive or view the left view device display images as if the left view device display images are displayed on the image plane or the virtual display. Likewise, the right view imager (154-1) emits right view light rays that reach the right eye (158-1) of the viewer (112) to allow the viewer (112) to visually perceive or view the right view device display images as if the right view device display images are displayed on the image plane or the virtual display.

In some embodiments, the image plane or the virtual display may be located at a depth different from or the same as that of the optical stacks (152-1 and 152-2) in reference to the viewer. As used herein, the term "depth" may refer to a spatial distance between the viewer (or the viewer's eyes) and an image plane of a display (e.g., cinema display, device display, etc.) or a spatial distance between the viewer (or the viewer's eyes) and an object (e.g., a real-life object, a depicted object, etc.).

In some embodiments, the imagers (154-1 and 154-2) can display or project device display images at a single image plane of a single distance or at multiple image planes of multiple different distances (e.g., through time-division multiplexing, etc.) in front of the viewer. These distances of the image planes can be fixed or auto tunable. Example device displays or imagers with image plane(s) of auto tunable distance(s) from viewers can be found in U.S. Provisional Patent Application No. 62/414,901, with an application title of "EYEWEAR DEVICES WITH FOCUS TUNABLE LENSES," filed on Oct. 31, 2016, the entire contents of which are hereby incorporated by reference as if fully set forth herein.

For example, the left view imager (154-2) and the right view imager (154-1) may operate with lens elements (e.g., with fixed focal lengths, etc.) included in the left view optical stack (152-2) and the right view optical stack (152-1) to project the left view device display images and the right view device display images from an image plan at a fixed depth to the viewer (112). In another non-limiting example, the left view imager (154-2) and the right view imager (154-1) may operate with optical or lens elements included in the left view optical stack (152-2) and the right view optical stack (152-1) to project the left view device display images and the right view device display images from an image plan at multiple fixed depths to the viewer (112). Example optical or lens elements as described herein may include, but are not necessarily limited to only, any of: optical or lens elements with fixed focal lengths, optical or lens elements with variable focal lengths, adaptive optics, adaptive optics/lenses actuated/controlled by piezoelectric devices/elements, adaptive liquid crystal optics/lenses, lenses of deformable surfaces, variable power optics, filters, anti-reflective coatings, reflective coatings, optical thin films, etc.

In some embodiments, the wearable device (102) can generate a set of time sequential or time synchronous 3D device images from a single 3D device image and depth information (e.g., a depth map, etc.) specifying individual depths of individual visual objects depicted in the single 3D image. The set of time sequential or time synchronous 3D device images may be consecutively or concurrently displayed by the imagers (154-1 and 154-2) at different depths (or multiple device displays or multiple image planes) at different time sub-intervals within an overall image frame interval (or time duration) allocated to displaying the single 3D device image from which the set of time sequential or time synchronous 3D device images is derived.

Additionally, optionally or alternatively, the left view imager (154-2) and the right view imager (154-1) may operate with lens elements included in the left view optical stack (152-2) and the right view optical stack (152-1) to project the left view device display images and the right view device display images from an image plan at a variable or auto-tunable depth to the viewer (112). Examples of displaying images on image planes at variable depths can be found in the previously mentioned U.S. Provisional Patent Application Ser. No. 62/414,901.

The left view optical stack (152-2) represents an electrooptical stack that allows left view light rays emitted or reflected off from the real-life objects in the physical environment or the depicted objects from the external display (e.g., a cinema display, a home entertainment display, etc.) to reach (or to be transmitted to) the left eye (158-2) of the viewer (112). The right view optical stack (152-1) represents an electrooptical stack that allows right view light rays emitted or reflected off from the real-life objects in the physical environment or the depicted objects from the external display to reach (or to be transmitted to) the right eye (158-1) of the viewer (112). At runtime, the left view optical stack (152-2) may be optically transparent to the left view light rays and the right view optical stack (152-1) may be optically transparent to the right view light rays.

An electrooptical stack as described herein may comprise one or more optical and/or electrooptical component layers including but not limited to a combination of one or more of: light transmissive component layers, light reflective component layers, light filtering layers, light modulation layers, micro-prism layers, micro-lens layers, variable or fixed lenses, beam splitters, beam combiners, filters, anti-reflective coatings, reflective coatings, optical thin films, light engines, switching elements (e.g., transistor-based, etc.) to control levels of light transmittance (or transmissivity) or light reflectance (reflectivity), etc.

Techniques as described herein can be used to support rendering and viewing 3D images with a wide variety of left/right eye separation technologies including but not limited to those based on anaglyph, linear polarization, circular polarization, shutter glasses, spectral spatial separation, etc. Any of the foregoing left/right eye separation technologies may be used in the wearable device (102) to allow light rays used for rendering left view external display images and the right view external display images to respectively reach the left eye (158-2) and the right eye (158-1)—or to respectively reach eye vision sweet spots (e.g., foveal vision) spatially separated by an interpupil distance 156—of the viewer (112).

Figure 2A:
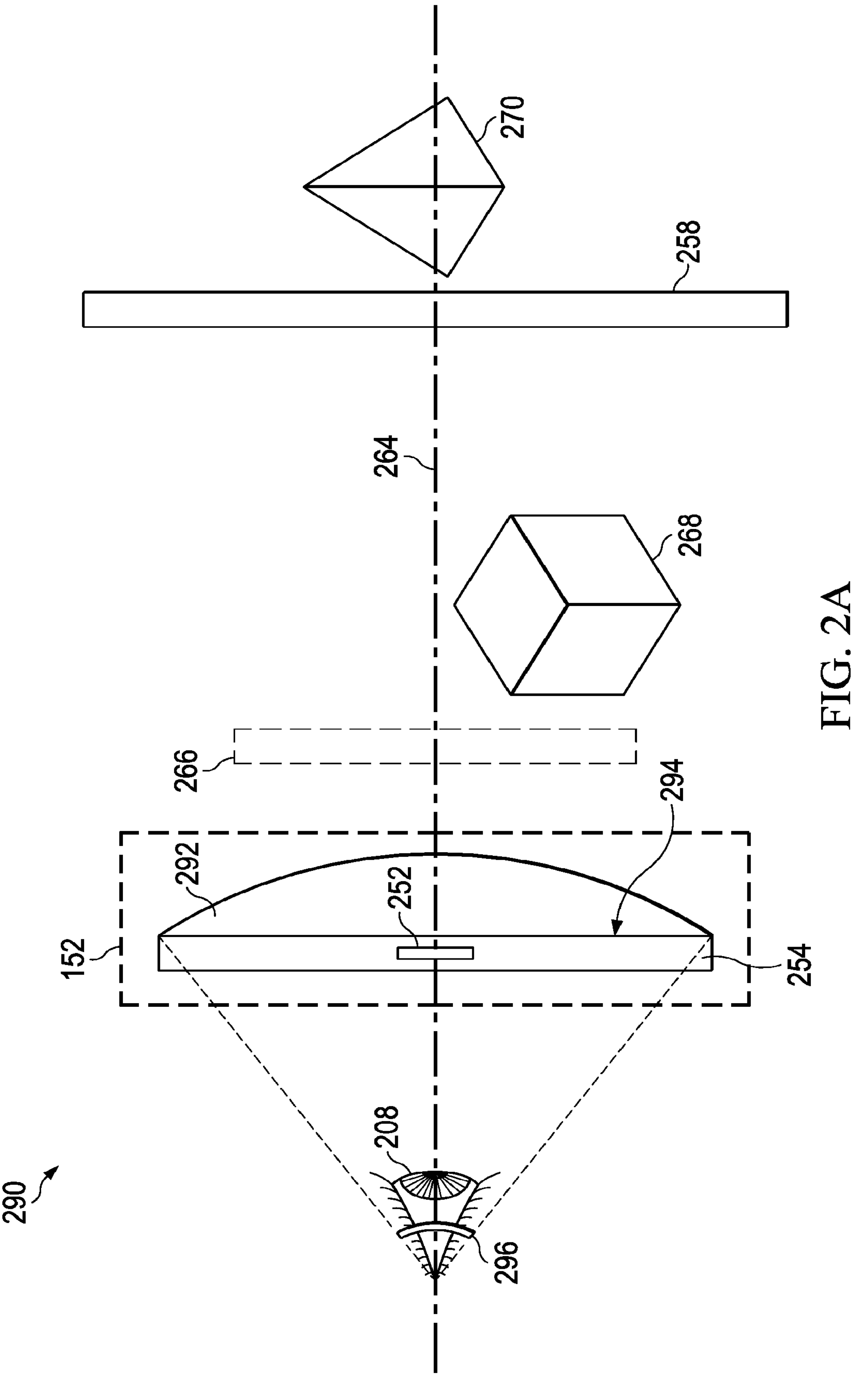
Figure 2B:
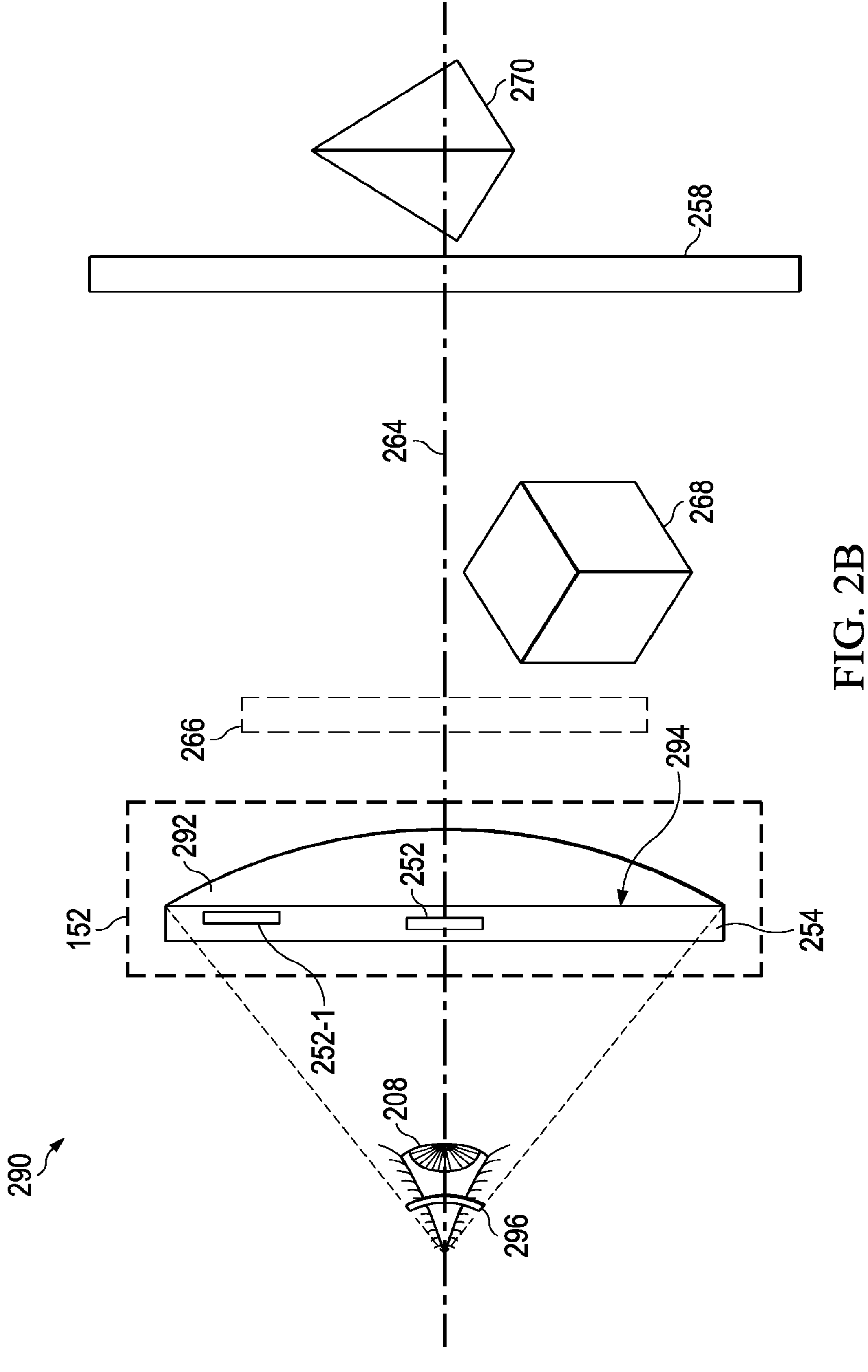
Figure 2C:
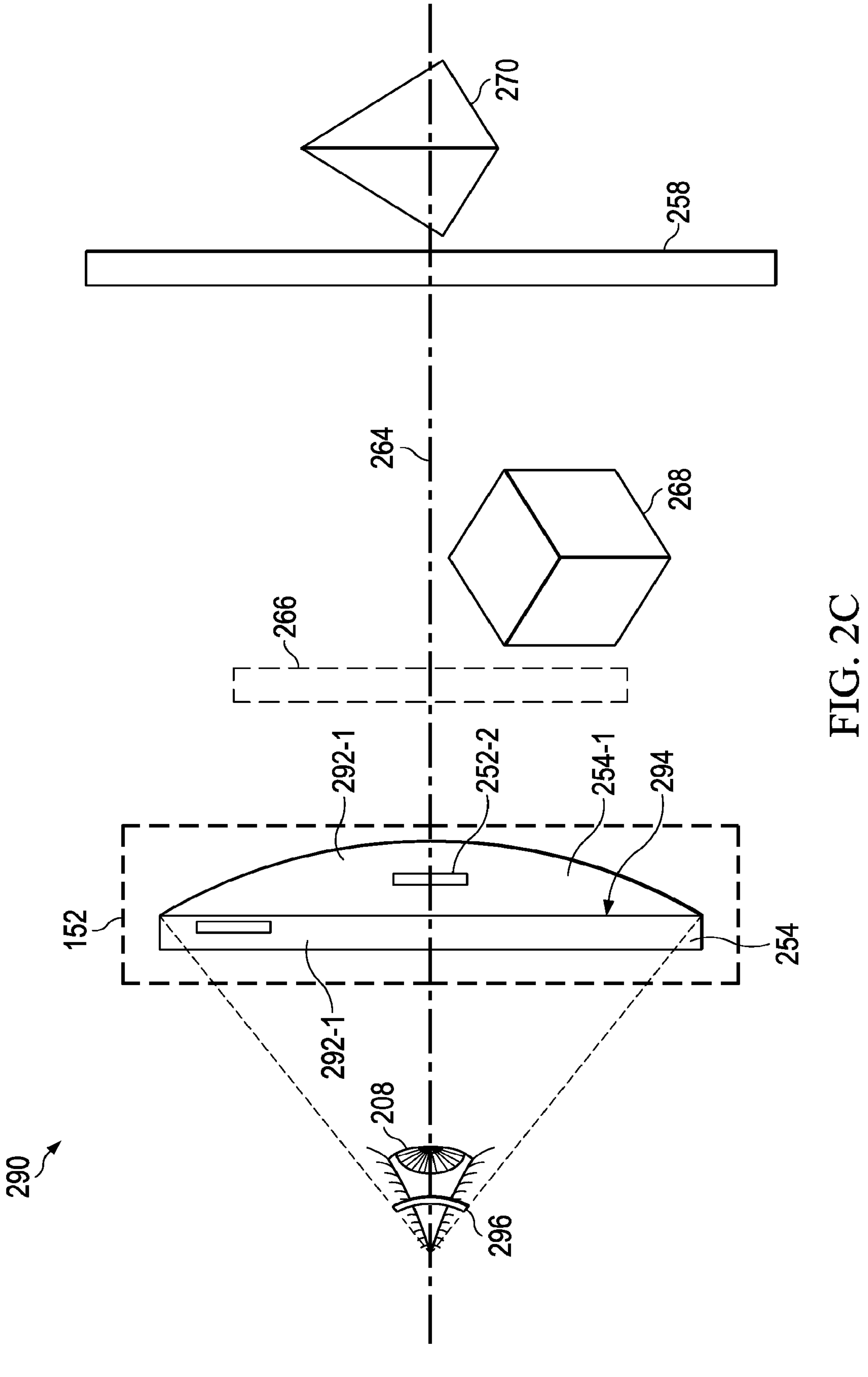

In some embodiments, the left view optical stack (152-2) and the right view optical stack (152-1) may implement anaglyph 3D techniques for viewing the left view external display images and the right view external display images rendered on the external display (e.g., 258 of FIG. 2A through FIG. 2C, external to the wearable device (102), a separate display from that of the imagers (154-1 and 154-2), etc.). The left view optical stack (152-2) and the right view optical stack (152-1) provide left/right eye separation by filtering the light (e.g., red light for rendering one image rendered and cyan light for rendering the other image, etc.) through two color filters such as a red filter and a cyan filter.

In some embodiments, the left view optical stack (152-2) and the right view optical stack (152-1) may implement linear polarization 3D techniques for viewing the left view external display images and the right view external display images rendered on the external display. The left view optical stack (152-2) and the right view optical stack (152-1) provide left/right eye separation by filtering linearly polarized light (vertically polarized light for rendering one image and horizontally polarized light for rendering the other image) through two orthogonal linear polarizers such as a vertical polarizer and a horizontal polarizer.

In some embodiments, the left view optical stack (152-2) and the right view optical stack (152-1) may implement circular polarization 3D techniques for viewing the left view external display images and the right view external display images rendered on the external display. The left view optical stack (152-2) and the right view optical stack (152-1) provide left/right eye separation by filtering circularly polarized light (left-handedly polarized light for rendering one image and right-handedly polarized light for rendering the other image) through two orthogonal circular polarizers such as a left-handed polarizer and a right-handed polarizer.

In some embodiments, the left view optical stack (152-2) and the right view optical stack (152-1) may implement shutter glasses 3D techniques for viewing the left view external display images and the right view external display images rendered on the external display. The left view optical stack (152-2) and the right view optical stack (152-1) provide left/right eye separation by left/right eye shuttering (a first image displaying time interval for rendering one image and a second image displaying time interval for rendering the other image) through synchronizing time-multiplexed viewing of left and right eyes with time-multiplexed rendering of respective left and right images.

In some embodiments, the left view optical stack (152-2) and the right view optical stack (152-1) may implement spectral spatial separation 3D techniques for viewing the left view external display images and the right view external display images rendered on the external display. The left view optical stack (152-2) and the right view optical stack (152-1) provide left/right eye separation by filtering the light (e.g., a first set of red, green and blue light for rendering one image rendered and a second set of red, green and blue light for rendering the other image where the first set of red, green and blue light is spectrally separated from the second set of red, green and blue light, etc.) through two spectral light filters (e.g., a first filter that passes the first set of red, green and blue light but rejects the second set of red, green and blue light and a second filter that passes the second set of red, green and blue light but rejects the first set of red, green and blue light, etc.).

In various embodiments, the wearable device (102) may use same or different left/right eye separation technologies for rendering the left view device display images and the right view device display images, as compared with those for rendering the left view external display images and the right view external display images. In an example, the wearable device (102) may comprise spatially separated left and right view imagers (e.g., 154-2 and 154-1, etc.)—for example located apart with approximately the interpupil distance (156)—to project the left view device display images and the right view device display images to the left eye (158-2) and the right eye (158-1), respectively. In another example, the wearable device (102) may comprise a central imager (e.g., mounted on a top bar of the eyeglass frame, etc.) to route or project the left view device display images and the right view device display images to the left eye (158-2) and the right eye (158-1), respectively.

3. Embedding Devices Into Optical Stacks

FIG. 2A illustrates an example first view optical stack 152 (e.g., 152-1 of FIG. 1, 152-2 of FIG. 1, etc.) of a wearable device (e.g., 102 of FIG. 1, etc.) as related to a viewer's first eye 158. The viewer's first eye (158) in FIG. 2A may be the left eye (e.g., 158-2 of FIG. 1, etc.) or the right eye (e.g., 158-1 of FIG. 1, etc.) of the viewer (112) as shown in FIG. 1, whereas the viewer's second eye (not shown) may the conjugate eye to the viewer's first eye (158).

In some embodiments, the wearable device (102) comprises a first view imager used to generate first view device display images for the viewer's first eye to view.

Some or all of the first view imager may be external to the first view optical stack (152). In a first non-limiting implementation example as illustrated in FIG. 1, the first view imager may be a right view imager (154-1 of FIG. 1) external to a right view optical stack (152-1 of FIG. 1) as the first view optical stack (152). In a second non-limiting implementation example as illustrated in FIG. 1, the first view imager may be a left view imager (154-2 of FIG. 1) external to a left view optical stack (152-2 of FIG. 1) as the first view optical stack (152).

Additionally, optionally or alternatively, some or all of the first view imager may be affixed in the first view optical stack. etc.). In a non-limiting implementation example, the first view imager may represent some or all of an embedded device 252 affixed (e.g., molded, etc.) within a substrate 254.

In some embodiments, through the first view optical stack (152), the viewer's first eye (208) receives light rays (e.g., 212-1, 212-2, etc.) emitted or reflected off from a visual object 270. In some embodiments, the visual object (270) may represent a real-life object in a physical environment 290. In some embodiments, the visual object (270) may represent a depicted object on an external display 258 external to the wearable device (102).

In some embodiments, by operations of the first view imager (154), a second visual object 268 may be visually perceived by the viewer's first eye (208) as coming from device display images rendered by the first view imager (154) at an image plane 266. Additionally, optionally or alternatively, other visual objects may be visually perceived by the viewer's first eye (208) through the operations of the first view imager (154) or the first view optical stack (152).

As illustrated in FIG. 2A, the first view optical stack (152) comprises one or more optical elements (e.g., 292, etc.) through which the viewer's first eye (208) views one or more visual objects (e.g., 268, 270, physical objects, depicted objects, virtual objects, real-life objects, etc.) located at one or more spatial distances (e.g., imagery spatial distances, physical spatial distances, etc.) from the viewer's first eye (208).

In some embodiments, an embedded device (e.g., 252 of FIG. 2A or FIG. 2B, 252-1 of FIG. 2B, 252-2 of FIG. 2C, etc.) as described herein may comprise, but not necessarily limited to only, circuitry on a substrate (e.g., printed circuit board or PCB, non-PCB substrate, etc.). In some embodiments, a substrate described herein imperceptibly matches a refractive index of an optical component (and/or a substrate) in which the embedded device is affixed. In some embodiments, the substrate comprises at least one of light waveguides, Fresnel lenses, and lens to alter direction of light rays away from any affixed circuitry mounted or attached to the substrate to achieve the imperceptibility of the affixed circuitry.

In some embodiments, as illustrated in FIG. 2A and FIG. 2B, the embedded device (e.g., 252 of FIG. 2A or FIG. 2B, 252-1 of FIG. 2B, etc.) may be affixed in a substrate (e.g., 254 of FIG. 2A or FIG. 2B, in a first view optical stack 152, etc.), which may be external to an optical element (e.g., 292 of FIG. 2A or FIG. 2B, etc.) to which the substrate is in physical contact through a physical contact area portion (e.g., 294 of FIG. 2A or FIG. 2B, etc.) as described herein.

In some embodiments, as illustrated in FIG. 2C, an optical element 292-1 in a first view optical stack (e.g., 152, etc.) may itself be formed by one or more substrates (e.g., 254, 254-1, etc.) and zero or more non-substrates. An embedded device (e.g., 252-2, etc.) may be embedded, affixed and/or hidden in a substrate (e.g., 254-1, etc.) of the optical element (292-1). The substrate (254-1) may be the same as 292 of FIG. 2A or FIG. 2B and may form the optical element (292-1) with another substrate 254. The other substrate (254) of FIG. 2C may be the same as the substrate (254) of FIG. 2A or FIG. 2B.

In some embodiments, inside the optical element (292-1), both the substrates (254 and 254-1), exclusive of any embedded device (e.g., 252-2, etc.) may form the optical element (292-1) as a contiguous homogeneous non-distinct part.

In some embodiments, inside the optical element (292-1), both the substrates (254 and 254-1), exclusive of any embedded device (e.g., 252-2, etc.) may be distinct parts and may be placed in physical contact through a physical contact area portion, which may be the same as 294 of FIG. 2A or FIG. 2B.

The substrate (254) may be placed in physical contact (e.g., with no or little airgap in between) with an optical element 292 in the one or more optical elements of the first view optical stack (152). In some embodiments, the substrate (254) is made up of a molding material with an optical refractive index (e.g., a refractive index in all light wavelength spectrum/bands for which the substrate (254) and the optical element (292) are optically transparent, etc.) matching an optical refractive index (in the same light wavelength spectrum/bands for which the substrate (254) and the optical element (292) are optically transparent) of the optical element in physical contact with the substrate (254). A substrate as described herein may be permanently affixed to an optical stack or an optical element therein.

Thus, under techniques as described herein, at least for the same light wavelength spectrum/bands for which the substrate (254) and the optical element (292) are optically transparent, a physical (e.g., material, layer, component, etc.) transition/change between the substrate (252) and the optical element (292) does not introduce, or is prevented from introducing, an optical refractive index transition/change between the substrate (252) and the optical element (292).

Given no or little optical refractive index change between the substrate (252) and the optical element (292), for light rays traversing through the physical transition/change between the substrate (252) and the optical element (292), light speeds are kept the same. Any light ray reflections and light ray refractions (with outgoing light ray directions different from incoming light ray directions)—which would otherwise be caused by an optical refractive index transition/change between the substrate (252) and the optical element (292 under other approaches that do not implement techniques as described herein—are thus minimized or eliminated.

As the embedded device (252) is set or affixed within the substrate (254) with no or little optical boundary (as represented by a step change in optical refractive indexes of the substrate (254) and the optical element (292)) introduced, the embedded device (e.g., affixed components thereof, etc.) may be kept visually imperceptible by the viewer (e.g., the viewer's first eye (208), etc.).

The substrate (254) may be in physical surface contact with the optical element (292) over a physical contact surface portion 294. A hole or cavity—which would likely introduce airgaps and surfaces prone to generating specular reflections that may be visually perceptible to the viewer's first eye (208)—does not need to be created or bored on the optical element (292) in order to fit the substrate (254). For example, the substrate (254) may comprise a contact surface portion that is (e.g., with a high precision, without introducing any airgap, with little airgap, with only one or more optical films, etc.) co-planar or co-curvilinear (e.g., sharing, tracing and/or traversing the same surface contours/shapes, etc.) with a corresponding contact surface portion of the optical element (292) with which the contact surface portion of the substrate (254) is to form the physical contact surface portion (294).

The physical contact surface portion (294) between the substrate (254) and the optical element (292) may be of a relatively large aperture diameter (e.g., 100%, 80% or more, 50% or more, etc.) comparable to an aperture diameter of the optical element (292). A solid angle 296, as covered by the physical contact surface portion (294), of the viewer's first eye (208) is inclusive of an expected view direction 264 of the viewer's first eye (208). In some embodiments, the expected view direction (264) is determined or set as an optical axis of the first view optical stack (152); it may or may not be the actual view direction of the viewer's first eye (208) at a given time point.

In some embodiments, as illustrated in FIG. 2A, the embedded device (252) may be located along the expected view direction (264). The embedded device (252) may be of a relatively small diameter as compared with the aperture diameter of the first view optical stack (152), the aperture diameter of the physical contact surface portion (294), etc. Example diameter of the embedded device (252) may include, but are not necessarily limited to only, any of: 10%, 5%, 3%, etc., of the aperture diameter of the first view optical stack (152); comparable to, smaller than, no more than five times, no more than four times, no more than twice, etc., a spatial resolution threshold of the viewer as represented with the HVS; and so forth. As the viewer's first eye (208) is expected to be focusing on the visual object (270) along the expected view direction (264), light emitted or reflected off from the embedded device (252) does not form an image of the embedded device (252) in the viewer's first eye (208) or the retina area (or image plane) thereof. Thus, the embedded device (252) of the relatively small size/diameter is completely or substantially not visually perceptible to the viewer's first eye (208).

Additionally, optionally or alternatively, as illustrated in FIG. 2B, an embedded device (e.g., 252-1, etc.) as described herein may be located away from the expected view direction (264).

In some embodiments, an embedded device (e.g., 252 and 252-1, etc.) may comprise a plurality of subcomponents distributed at a plurality of different spatial locations of the substrate (254). For example, an adaptive optical system may comprise an adaptive lens with one or more deformable surface curvatures (or optical powers) actuated/controlled by a piezoelectric device. The piezoelectric device may comprise individual piezoelectric elements/components to control or actuate the deformable surface curvatures of the adaptive lens. These individual piezoelectric elements/components may be located at a plurality of different spatial locations of the substrate (254). A first piezoelectric element/component may be an embedded device (e.g., 252 of FIG. 2A or FIG. 2B, etc.) at a first spatial location of the substrate (254), whereas a second piezoelectric element/component may be a different embedded device (e.g., 252-1 of FIG. 2B, etc.) at a second different spatial location (different from the first spatial location) of the substrate (254).

In some embodiments, the substrate (254) may be made of a molding material that is optically transparent to visible light (to a human visual system or the HVS) in the entire visible light spectrum or at least one or more bands thereof.

The embedded device (252) may, but is not limited to, be affixed into the substrate (254) through molding. By way of example but not limitation, a mold such as a (e.g., rectangular, regular, curved, convex, concave, irregular, etc.) hollowed-out geometric shape may be filled with a molding material in a liquid or pliable state with the embedded device (252) set in a specific spatial relationship to the mold so that the molding material along with the embedded device (252) adopts some or all of a shape of a hollowed-out region of the mold. Example molding materials may include, but are not necessarily limited to only, one or more of: silicones, polymeric organosilicon compounds, organic polymer materials, PDMS materials, epoxy materials, thermosetting polymer materials, ultraviolet light cured epoxy materials, homogeneous materials, gel materials, non-gel materials, molding materials with relatively good thermal conductivity, molding or optical materials with relatively high UV resistance, molding or optical materials for refractive index matching bonding, etc.

An embedded device (e.g., 252 of FIG. 2A or FIG. 2B, 252-1 of FIG. 2B, 252-2 of FIG. 2C, etc.) as described herein may be placed in an optical path such as an expected view direction (e.g., determined based on position(s) and/or orientation(s) of the wearable device (102), etc.), or off the optical path.

In some non-limiting implementation examples, a hole or cut-out in one of the optical elements or one of the substrates of the first view optical stack (152) can be fashioned. The embedded device can be placed in the hole or cut out. Additionally, optionally or alternatively, some or all of the circuitry or components in the embedded device can be disposed on a substrate. The substrate may, but is not necessarily limited to only, be a molding material of any appropriate kind. However, to minimize observation or visual perception of the embedded device by the viewer, the substrate may be made of one or more materials with the same or substantially the same refractive index as the optical element or the substrate into which the substrate is to be placed or affixed. The substrate design may be specifically selected to minimize visual perceptibility distinct from the optical element or the substrate. In other words, the embedded device may be specifically designed and/or spatially positioned to not cause any unnecessary light reflections or refractions because of a change or mismatch in the refractive indexes of materials that are spatially adjacent to, or in physical contact with, one another.

By way of example but not limitation, molding circuitry or components such as LEDs, nanowires, ITO conductive materials, or other electronic and/or non-electronic components on or between (e.g., optical, transparent, etc.) substrates can be done with materials (for substrates) such as PDMS materials or index matching epoxy materials. This molding step for some or all components in the embedded device can be performed in various times, such as before or after processing/making of optical components of the wearable device.

In an example, the wearable device may be made with the embedded device in place before releasing the wearable device to an end user (or the viewer) who may use the wearable device for AR applications, VR applications, remote presence applications, augmented entertainment experiences, automobile entertainment experiences, etc.

In another example, the wearable device (other than the embedded device and/or the substrate used to embed, affix and/or hide the embedded device) may be pre-made without the embedded device in place. The embedded device and/or the substrate used to embed, affix and/or hide the embedded device may be affixed to (e.g., an optical element of, etc.) a first view optical stack of the wearable device before releasing the wearable device to an end user (or the viewer) who may use the wearable device for AR applications, VR applications, remote presence applications, augmented entertainment experiences, automobile entertainment experiences, etc.

Regardless of whether the embedded device is incorporated as a part of the wearable device before, after, or at the same time of manufacturing the wearable device, by implementing some or all device hiding techniques as described herein (including but not limited to refractive index matching of materials involved in molding or incorporating the embedded device into the wearable device), affixed-device related visual artifacts—for example, glares, shadowing, diffractions, reflections, refractions, etc., of light from the embedded device or any electronic and/or non-electronic components therein—through the optical elements (e.g., lenses, etc.) and/or the substrates to the viewer or camera can be avoided or significantly reduced.

Nanowire connections or patterning, ITO connections and patterning, and so forth, can be made on a relatively flat substrate. LEDs or light emitters can be assembled with the substrate. Lens elements can be used to encapsulate some or all circuits implemented with the substrate, for example by way of substrates.

In some embodiments, electric connection features such as nanometer diameter wires may be fabricated using laser etching, ultraprecise printing of nanomaterials, etc. These fabricated features may be kept to a size to which human eyes cannot resolve. As these features are likely not a focal point for a viewer's eye, light emitted or reflected off from these features and/or light occlusions and/or opaque or tinted screens placed to hide these features may not form any discernible image of the features or visual artifacts indicating the presences of the features. Thin electric wires incorporated in an embedded device may cause a relatively small loss of light, which may be relatively easily compensated by an optical stack as described herein through converging, routing and/or focusing light rays that are around the viewer's expected view direction toward a visual source as illustrated in FIG. 2D.

Engineering objectives/goals (e.g., target electric resistance below a certain value, manufacturing scalabilities, non-visibility, etc.) may be used to select one or more specific types of electric interconnections used in an embedded device as described herein. Additionally, optionally or alternatively, inductive connections, connections without physical wiring, photovoltaic elements, electromagnetic inductive elements, etc., can be incorporated in an embedded device as described herein (e.g., for supplying power to one or more components, circuity, etc., in the embedded device, etc.).

FIG. 2D illustrates an example optical stack 152-3, which may be included in a wearable device or a non-wearable device. A visual observer 208-1 (e.g., a human eye, a camera, an image sensor, etc.) may view, through the optical stack 152-3, some or all of the outside world (e.g., on the left side of the optical stack 152-3, etc.) in which object sources or visual objects are located. At least a part of light rays emitted or reflected off from the object sources can be collected and routed by the optical stack (152-3) to the visual observer (208-1).

In an example, the optical stack (152-3) may be a left view optical stack (e.g., 152 of FIG. 1, etc.) or a right view optical stack (e.g., 152-2 of FIG. 1, etc.) of a wearable device (e.g., 102 of FIG. 1, etc.), operating in conjunction with a viewer's eye as the visual observer (208-1). In another example, the optical stack (152-3) may be an optical stack operating in conjunction with, or as a part of, a camera as the visual observer (208-1).

By way of example but not limitation, the optical stack (152-3) may comprise a number of optical elements such as a light router 292-2, a first (optical) lens 292-3 of a first focal length, a second (optical) lens 292-4 of a second focal length, and so forth. Example light routers may include, but are not necessarily limited to only, any of: Fresnel structures/lenses, grating structures, light waveguides, etc.

The optical stack (152-3), or the optical elements therein, can be designed to generate a number of spatial regions 296 hidden from (or visually imperceptible to) the visual observer (208). As illustrated in FIG. 2D, the spatial regions (296) hidden from the visual observer (208) may be located within an optical element (e.g., the first lens (292-3), the second lens (292-4), etc.), in between optical elements (e.g., between the first and second lenses (292-3 and 292-4), etc.), front or back of the optical stack (252-3), and so forth.

By way of illustration, an embedded device 252-3 may be embedded, affixed and/or hidden inside one of the spatial regions (294), such as within or next to the first lens (292-3). The embedded device 252-3 may be directly affixed within an internal substrate (e.g., 254-1 of FIG. 2C, etc.) of the first lens (292-3) or a separate substrate (e.g., 254 of FIG. 2A or FIG. 2B, etc.). Example embedded devices as described herein may include, but are not necessarily limited to only, one or more of: eye trackers, piezoelectric devices, cameras, LEDs, light illuminators (e.g., for illuminating eyes with invisible infrared light, etc.), etc.

In some embodiments, (any) visible light, originally directed toward the visual observer (208-1), as emitted or reflected off from the embedded device (252-3) can be diverted away from the visual observer (208-1), for example using diverting structural elements 298 of the light router (292-2). Additionally, optionally or alternatively, the refractive index of the light router (292-2) may be so chosen and/or implemented to cause some or all incident light from the embedded device (252-3) to be totally reflected at the interface between the diverting structural elements (298) and an airgap separating the optical stack (152-1) from the visual observer (208-1).

In some embodiments, (any) visible light, originally directed away from the visual observer (208-1), as emitted or reflected off from the embedded device (252-3) can be prevented from being reflected back toward the visual observer (208-1), for example using refractive index matching between the substrate that embeds, affixes and/or hides the embedded device (252-3) and optical element(s) (or even airgaps) that are physically in contact with the substrate.

Thus, most if not all light emitted or reflected off from the embedded device (252-3) that may otherwise reach the visual observer (208-1) can be prevented under techniques as described herein from reaching the visual observer (208-1) so that the embedded device (252-3) is entirely or substantially (e.g., smaller than what the visual observer (208-1) can visually resolve, etc.) hidden or visually imperceptible to the visual observer (208-1) during the visual observer (208-1) is operating with the optical stack (152-3) to view object sources (e.g., objects depicted by an imager, objects depicted on an external display (e.g., 258 of FIG. 2A through FIG. 2C, etc.), real-life objects in a physical environment, etc.) in the outside world that are on the right side of the optical stack (152-3) of FIG. 2D, etc.

As illustrated in FIG. 2D, at a given time, light (or optical) rays emitted or reflected off from an object source 270-1 located along an expected view direction 264-1 of the visual observer (208-1) can travel along ray paths 274 from the object source (270-1) to the visual observer (208-1) through the optical stack (152-3).

The optical stack (152-3) can be specifically designed to minimize blocking light rays emitted or reflected off from the object source (270-1) from reaching the visual observer (208-1) and maximize routing light rays emitted or reflected off from the object source (270-1) toward the visual observer (208-1). For example, the first lens (292-3), the second lens (292-4), and so forth, in the optical stack (152-3) that lie along the ray path (274) of the light rays emitted or reflected off from the object source (270-1) can be specifically designed to make use of a plurality of refractions to capture light rays (emitted or reflected off from the object source (270-1) or other object sources present as illustrated in FIG. 2D) that may or may not directed toward the visual observer (208-1) and converge most if not all of the captured light rays toward the visual observer (208-1) without being blocked by the embedded device (252-3) by turning the light rays around the embedded device (252-3) (or around the expected view direction (264-1) where embedded device (252-3) is located). As a result, the visual observer (208-1) can see the object source (270-1) even when the embedded device (252-3) is located along the expected view direction (264-1) of the visual observer (208-1).

Techniques as described herein can be used to embed, affix and/or hide relatively large components and/or devices into an optical stack without causing a visual observer using the optical stack to visually detect presences (e.g., as would be indicated by shadows, light sparks, light flashes, light reflections, light occlusions, etc., caused by some or all of the components; as would be indicated by an opaque or low-optical transmission screen placed in front of some or all of these components, etc.) of these components and/or devices in operation.

In an example, relatively large components can be used in the optical stack to observe a viewer's eyes and track the viewer's gazes or view directions. Camera(s), image sensors (e.g., infrared image sensors, CMOS sensors, infrared sensitive CMOS sensors, etc.), eye illuminators (e.g., infrared light emitters, etc.), eye trackers, etc., can be placed relatively close in linear distance to the viewer's eyes as well as relatively close in angular distance to (e.g., identical to, etc.) the viewer's view directions, thereby increasing eye tracking accuracy and reducing system complexity.

In contrast, under other approaches that do not implement techniques as described herein, an eye tracker may have to be placed (e.g., at an oblique angle, etc.) in a place where observation of the viewer's eyes. Such an eye tracker may have to implement additional algorithms to compensate or transform measuring results from an angle that is very different from the viewer's view direction.

Under techniques as described herein, light routers such as Fresnel surfaces, grating structures, light waveguides, and so forth, can be used to route light rays around affixed components and/or devices and help hide relatively large components and/or devices such as cameras in a package or in an optical stack. CMOS small footprint sensors.

Camera(s), image sensors (e.g., infrared image sensors, CMOS sensors, infrared sensitive CMOS sensors, etc.), eye illuminators (e.g., infrared light emitters, etc.), eye trackers, etc., may operate with light invisible to the viewer or the HVS, thereby reducing chance for the viewer's eyes to see any eye illumination (in invisible light wavelengths) used by these components and/or devices.

In some embodiments, as illustrated in FIG. 2D, a beam splitter (e.g., 272, etc.) such as a hot mirror coating (e.g., which reflects infrared light originally reflected off from the viewer's eye(s), etc.) may be implemented in (or incorporated as a part of) an optical stack (e.g., 152-1, etc.), for example on an outer surface of an optical element such as the back surface of the first lens (292-3). As illustrated in FIG. 2D, at a given time, light (or optical) rays emitted reflected off from the visual source (208-1), which is an object source for an eye tracker or camera (e.g., in the embedded device (252-3), etc.), can travel along ray paths 276 from the visual source (208-1) and reflected by the beam splitter (272) toward the embedded device (252-3). The light rays reflected off from the visual source (208) may be invisible light such as infrared light originally emitted by an eye illuminator (e.g., as a part of the embedded device (252-3), a separate device operating in conjunction with the embedded device (252-3), etc.).

The beam splitter (272) may be incorporated into the optical stack (152-1) to allow the eye tracker (or camera) to be optionally located at a relatively faraway position to (as compared with a position directly facing) the viewer's eye(s), instead of locating at a relatively close position directly facing the visual observer (208-1). This allows the eye tracker to accurately and efficiently monitor and track the viewer's eye(s). As the viewer's eye(s) (or the visual observer (208-1)) is visually focusing the object source (270-1), the eye tracker (or embedded device) will be out of visual focus for the visual observer (208-1), thereby significantly reducing chances of the visual observer (208-1) perceiving the eye tracker.

As discussed above, eye illumination light (e.g., infrared light, etc.) generating the light reflected off from the visual source (208-1) for eye tracking by the eye tracker can be made invisible to the visual observer (208-1). Additionally, optionally or alternatively, the beam splitter (272) can be specifically designed to reflect only invisible light (or wavelengths thereof) used by the eye illumination light and allow other light such as any extraneous visible light from the eye tracker to transmit through the beam splitter (272) with no or little light reflections.

In some embodiments, piezoelectric elements/components may be incorporated into an embedded device to control optical properties of some or all of optical elements in an optical stack as described herein, in addition to or in place of a camera, an eye tracker, etc.

The piezoelectric elements may be used as a piezoelectric device/controller to mechanically control or actuate shapes of deformable surfaces of lenses with (e.g., automatically, programmatically, etc.) tunable focal lengths, for example, by stretching or compressing curvatures of the deformable surfaces. A single piezoelectric element or a plurality of (e.g., spatially distributed, etc.) piezoelectric elements may be placed in an optical element and/or a substrate as described herein.

In a non-limiting implementation example, an embedded device affixed in an optical stack of a viewer's wearable device may include an eye illuminator (e.g., for generating IR light to illuminate a viewer's eye, etc.) an eye tracker, and a piezoelectric controller, etc. The eye illuminator and the eye tracker may be used to determine where the viewer's actual gaze direction, what distance of an object source the viewer's eye is visually focusing on, etc. The viewer's actual gaze direction, the distance of the object source, etc., may be used to determine an optimal optical power value for the optical stack. The optimal value may be provided in a feedback loop to the piezoelectric controller to control or actuate one or more adaptive optical elements in the optical stack to effectuate or realize the optimal power value for the optical stack.

Additionally, optionally or alternatively, adaptive optics of other types (e.g., liquid crystal (LC) based lenses of tunable focal lengths, etc.), switch elements, drivers, transparent electrodes, transparent electric insulators, integrated circuits, etc., may be molded or affixed into an optical element and/or a substrate, in addition to or in place of piezoelectric elements, eye trackers, cameras, LEDs, light emitters, image capturing elements, etc.

An embedded device may be placed along an expected view direction or in an expected foveal view of a viewer or placed outside the expected view direction or the expected foveal view. An embedded device or individual component (s) therein that are placed in near peripheral or peripheral vision of a viewer may look blurry to a viewer, even if facing directly to the viewer at a relatively close distance. Placing outside the viewer's foveal view, where visual acuity of the viewer's eye is relatively low, make visibility of the embedded device or the component(s) therein even lower.

For example, a camera may or may not be placed in an optical path representing the viewer's expected view direction, so long as the camera can be at a position at which the camera can collect light emitted or reflected off from an intended object source such as the viewer's eye. The embedded device may incorporate or implement program logic to correlate or convert collected raw image sensory data to processed image data relative to a specific spatial position (e.g., relatively close to the expected view direction, relatively close to the viewer's eye, at a central position in the viewer's vision field, etc.) and/or a specific spatial orientation that may be different from an actual spatial position (e.g., relatively far away, at a peripheral position in the viewer's vision field, etc.) and/or an actual orientation of the camera. A directly acquired image or a processed image (for the outside world) that is from a visual perspective of a specific location/orientation along an optical path representing the viewer's view direction can be used to provide an image with no or little correction, which indicates the same visual information as what is seen by the viewer's eye. A directly acquired image or a processed image (for the viewer's eye) that is from a visual perspective of a specific location/orientation along an optical path representing the viewer's view direction can be used to provide an image with no or little correction, which indicates the same visual information as what is seen from a central position of device display images to be rendered by an imager of the viewer's wearable device. Such image information can be used to adjust or adapt device display images and/or optical properties of an optical stack of the viewer's wearable device.

A gel type of material of a specific refractive index matching that of an interfacing optical element (e.g., a lens, etc.) may be used as some or all of a substrate (e.g., in physical contact with the lens, etc.) as described herein to mold or embed, affix and/or hide electronic and/or non-electronic components used in an embedded device that have very different optical properties from those of the optical element and the substrate. For example, a concave part of a lens can be used to interface with a gel layer (e.g., similar to placing a sticker on a lens, etc.) that hosts the embedded device and becomes a part of the lens without changing curvature, focal length, and other optical properties, of the lens.

A substrate (e.g., a sheet of a specific width sufficient to embed, affix and/or hide the embedded device or components therein, etc.) made of gel materials enables an embedded device or components therein to be easily molded or pushed into the substrate with gel substances of the substrate tightly (e.g., airtight, etc.) forming around the embedded device (with or without a physical housing/frame/chassis enclosing some or all of the embedded device) or individual components therein. As the embedded device can be molded into the substrate without generating airgaps and media boundaries with refractive index transitions/changes prone to generate extraneous refraction and reflections, surfaces as described herein that separate the embedded device, the substrate, and the lens (or optical element), can be made to generate no or little light reflections (e.g., specular reflections, light sparks/flashes, etc.) or refractions to cause a visual perception of the embedded device by a visual observer.

Furthermore, because the refractive index of the substrate can be specifically selected to match the refractive index of the lens (or optical element), transmissive and/or other optical properties of the lens (or optical element) without the substrate and the embedded device can be maintained largely unchanged even after the substrate and the embedded device are incorporated into or with the lens (or optical element).

In some embodiments, a substrate as described herein may be placed in between two optical elements. In a non-limiting implementation example, the substrate may be inserted in between two lenses to remove some or all airgaps between the two lenses.

In some embodiments, additional optical layers such as anti-reflective (AR) coating may be disposed on a substrate as described herein.

An embedded device (e.g., 252 of FIG. 2A or FIG. 2B, 252-2 of FIG. 2C, 252-3 of FIG. 2D, etc.) as described herein, including any substrate and/or circuitry therein, can be configured to be substantially aligned with a viewer's eye position. For example, the embedded device may be placed along the viewer's expected view direction (e.g., 264 of FIG. 2A, FIG. 2B or FIG. 2C, 264-1 of FIG. 2D, etc.). Techniques as described herein can be used to prevent the embedded device from being visually perceptible by the viewer, thereby avoiding distractions to the viewer and maintaining an immersive entertainment experience. The embedded device, or circuitry (e.g., eye tracker, camera, LED emitter, etc.) therein, has optical/visual access to (e.g., is able to view, is able to optically track, etc.) the viewer's eye. For example, under techniques as described herein, the embedded device or circuitry (e.g., image sensor, eye tracker, camera, etc.) can have an unobstructed line of sight to the viewer's eye, or the spatial position/orientation thereof.

In some embodiments, an embedded device—or circuitry, electronics or portions thereof—can be unseen or visually imperceptible to the viewer's eye, at the same time the embedded device can have a clear picture of the viewer's eye and/or the outside world. In this way, the embedded device, such as sensors, emitters and cameras, are positioned in the optical path to observe the eye while being unseen by the viewer. This can be accomplished by, as an example, bending light rays around (a spatial region including) the embedded device, for example as illustrated in FIG. 2D. Bending light around the embedded device can be achieved by carefully designed light waveguides, Fresnel lenses, grating structures, or other optical techniques.

Under techniques as described herein, an optical stack may comprise various spatial features, such as etched features, features in a rigid state, features created by moldable materials such as gel materials (which may be in a liquid state until cured before the optical stack is used in operation), features with fixed geometries, etc. The optical stack may have single optical element such as a single lens or multiple optical elements such as multiple lenses.

It should be appreciated that an embedded device including but not limited to circuitry therein can be any component in a wide variety of device applications. The embedded device can include an emitting device (e.g., an LED, etc.) and/or camera (e.g., an image sensor, etc.). Additionally, optionally or alternatively, the embedded device can include other devices such as piezoelectric devices to actuate, vibrate or change refractive indexes, surface shapes/curvatures of adaptive optical elements, LC controllers, and/or other control or non-control circuits that are included/affixed in an optical stack but hidden from the viewer's eye.

It should be further appreciated that emitters and/or cameras incorporated in an embedded device as described herein need not always see the viewer's eye. These and other affixed components may be incorporated or placed in some positions that the viewer's eye (or its optical axis or view direction) may or may not land. It should be noted that the viewer's eye does not always have to be in positions where any embedded device(s)—including but not limited image sensors, light emitters, passive components, controllers, etc.—need to be located. In operations, even if an embedded device is located/placed at a position passed through by the expected view direction (e.g., as determined by position(s) and/or orientation(s) of the wearable device, etc.), the viewer's actual view direction may or may not pass through such a position.

It has been described that a substrate of a refractive index matching that of an adjacent optical element in physical contact with the substrate may be used to embed, affix and/or hide a device or some or all of components thereof. It should be noted that, in various embodiments, a substrate of a refractive index matching or mismatching that of an adjacent optical element in physical contact with the substrate may be used to embed, affix and/or hide a device or some or all of components thereof. For example, light routers such as Fresnel structures, grating structures, light waveguides, etc., may be used to hide, or significantly reduce the spatial profile of, a device affixed in a substrate that may or may not have a refractive index matching that of an optical element nearby or in physical contact.

4. Augmented Entertainment Systems

Figure 3:
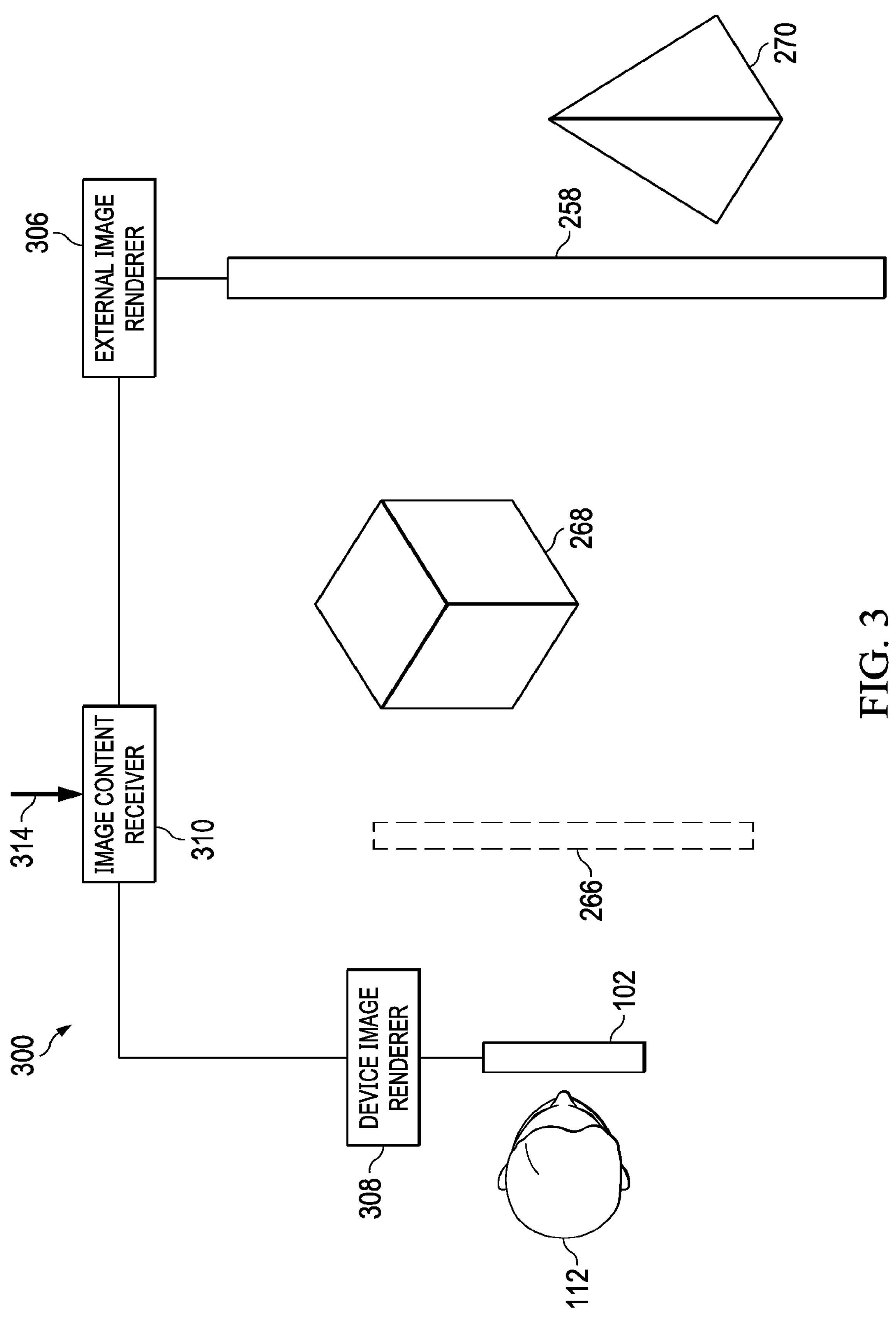
FIG. 3 illustrates an example configuration of an augmented entertainment system.

FIG. 3 illustrates an example configuration 300 of a (e.g., 3D, etc.) augmented entertainment system that comprises a wearable device 102, an external display 258, an external image renderer 306, a device image renderer 308, an image content receiver 310, etc. Some or all of the components/devices as depicted in FIG. 3 may be implemented by one or more mechanical components, one or more electrooptical components, one or more computing devices, modules, units, etc., in software, hardware, a combination of software and hardware, etc. Some or all of the components/devices as depicted in FIG. 3 may be communicatively (e.g., wirelessly, with wired connections, etc.) coupled with some other components/devices as depicted in FIG. 3 or with other components/devices not depicted in FIG. 3.

Example external displays as described herein may be a screen display in a cinema, a display in a home entertainment system, etc. In some embodiments, the external display (258) may be stationary in a 3D space (e.g., a cinema, a house, a venue, etc.) in which the external display (258) resides.

In some embodiments, the image content receiver (310) receives, from one or more image content sources, input image content 314 for rendering to one or more viewers (e.g., 112, etc.). The input image content (314) may be received in and decoded from one or more of: video signals, video files, video streams, etc. Example image content sources include, but are not necessarily limited to only, one or more of: data repositories, media content servers, media streaming servers, VR systems, AR systems, remote presence systems, video gaming systems, etc.

Example input image content may include, but is not necessarily limited to only, any of: stereoscopic images each of which comprises a left view and a right view, multi-view images each of which comprises two or more views, etc.

From one or more external image portions of the input image content (314), the image content receiver (310) identifies or generates one or more external display images. The one or more external display images may depict a first proper subset of one or more visual objects (e.g., 270, etc.) in a plurality of visual objects (e.g., 270, 268, etc.) depicted by the input image content (314).

From the one or more device image portions of the input image content (314), the image content receiver (310) identifies or generates one or more device display images. The one or more device display images may depict one or more proper subsets of one or more visual objects (e.g., 268, etc.)

in the plurality of visual objects (e.g., 270, 268, etc.) depicted by the input image content (314).

In some embodiments, the image content receiver (310) sends or otherwise provides, the one or more external display images to the external image renderer (306). Furthermore, the image content receiver (310) sends or otherwise provides the one or more device display images to the device image renderer (308).

The external image renderer (306) can render one the or more external display images, on the external display (304), such as one or more 3D cinema images comprising one or more left view cinema images and one or more right view cinema images. Likewise, based on the one or more device display images, the device image renderer (308) can cause the wearable device (102) to render one or more device display images such as one or more 3D device images comprising one or more left view device images and one or more right view device images on a device display 266, for example by way of light rays emitted by imager(s) in the wearable device (102).

In some embodiments, the external image renderer (306) and/or the device image renderer (308) perform display management operations as a part of rendering (a) the external display images and/or (b) the device display images.

The augmented entertainment system as illustrated in FIG. 3 may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. For example, some or all of input image content data (314) can be generated or accessed by the system in real time, in near real time, in non-real time, etc.

Techniques as described herein can be used to support rendering and viewing 3D or multi-view images with a wide variety of displays. Example displays may include, but are not necessarily limited to only, any of: a cinema display, a home theater display, a television, a projection-based display system, a backlight-based display system, a light field based display system, a light waveguide based display system, liquid crystal based display system, light emitting diode based system, organic light emitting diode based system, an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc.

5. Example Process Flows

Figure 4:
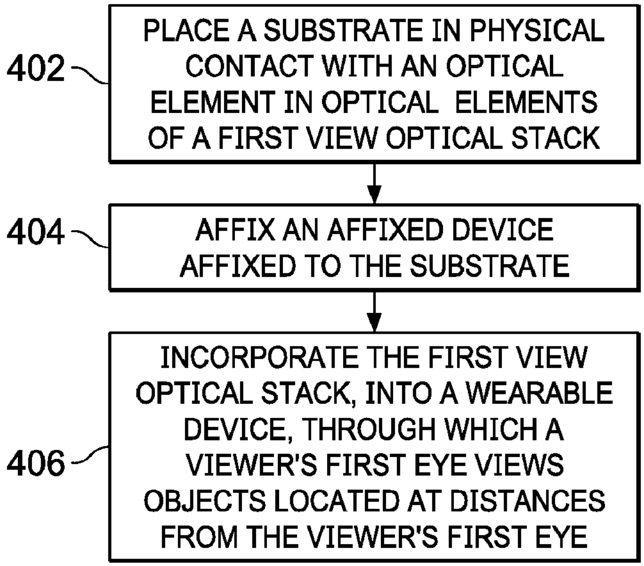
FIG. 4 illustrates example process flows.

FIG. 4 illustrates an example process flow according to an example embodiment of the present invention. In some example embodiments, an assembly or manufacturing system comprising one or more computing devices may perform at least a part of this process flow. In block 402, a substrate is placed in physical contact with an optical element in one or more optical elements of a first view optical stack, the substrate's optical refractive index matching the optical element's refractive index.

In block 404, an embedded device is affixed to the substrate.

In block 406, the first view optical stack is incorporated into a wearable device. Through the first view optical stack, a viewer's first eye views one or more objects located at one or more distances from the viewer's first eye.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
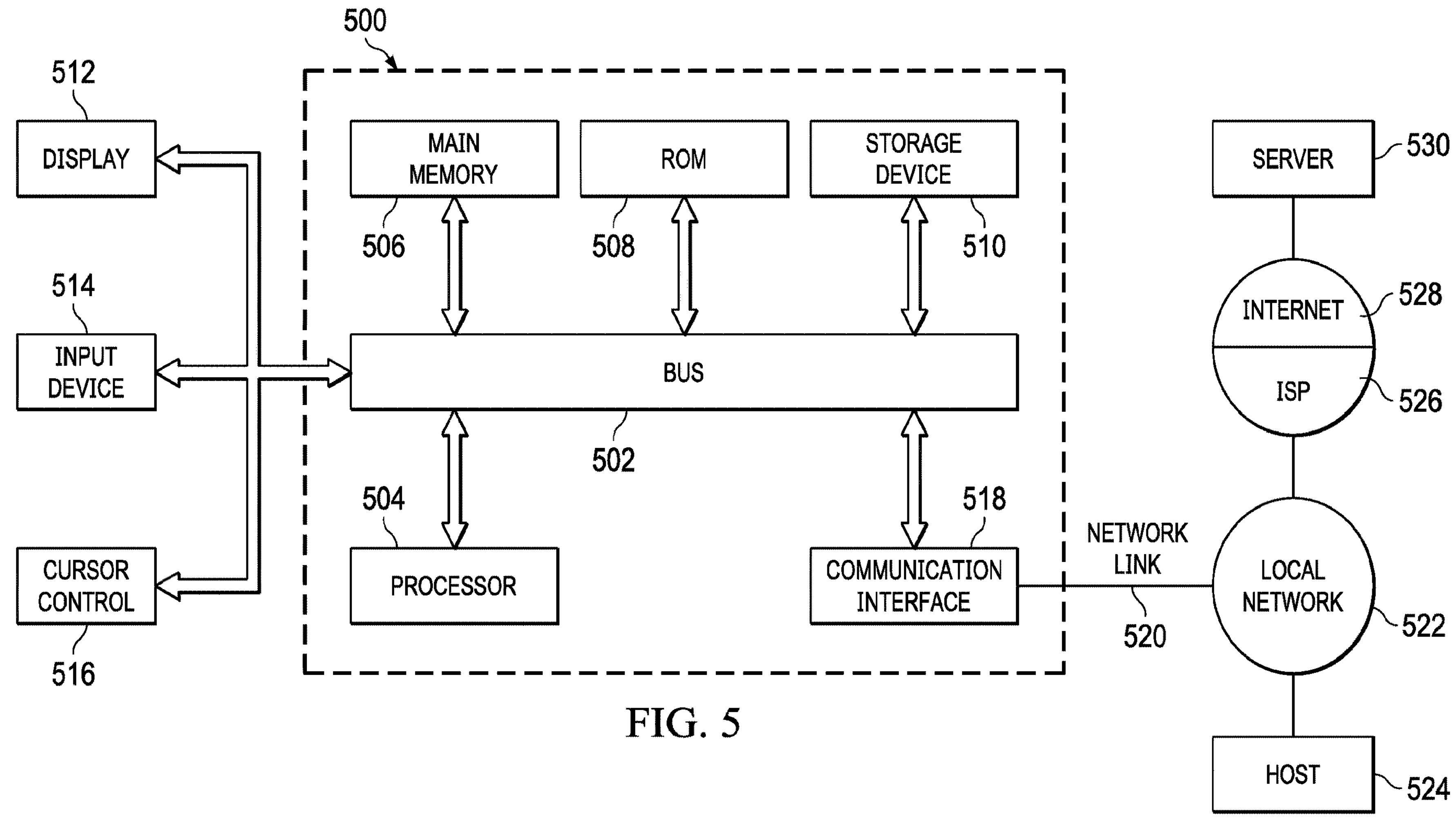
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A wearable device for a viewer, the device comprising:

a first view optical stack;

first circuitry on a first substrate affixed in a first optical element in the first view optical stack, optionally, the first substrate is configured to be substantially aligned with a viewer's first eye position; and wherein the first circuitry is imperceptible by the viewer, and the first circuitry has an unobstructed line of sight to the viewer's first eye position.

EEE2. The wearable device of EEE1, wherein the first circuitry comprises a camera, the camera capturing one or more reflections from a viewer's eye by an emitter.

EEE3. The wearable device of EEE1, wherein the first circuitry comprises an emitter, the emitter configured to illuminate a viewer's eye for reflections captured by a camera.

EEE4. The wearable device of EEE1, wherein the first circuitry comprises a camera and an emitter, the camera capturing one or more reflections of the emitter from a viewer's eye.

EEE5. The wearable device of any of EEEs 1 to 4, wherein the first substrate imperceptibly matches a refractive index of the first optical component.

EEE6. The wearable device of EEE5, wherein the first substrate comprises at least one of light waveguides, Fresnel lenses, and lens to alter direction of light rays away from the first circuitry to achieve the imperceptibility of the first circuitry.

EEE7. The wearable device of any of EEEs 1 to 6, further comprising:

a second view optical stack;

second circuitry on a second substrate affixed in a second optical element in the second view optical stack, the second substrate configured to be substantially aligned with the viewer's second eye position;

wherein the second circuitry is imperceptible by the viewer, and the second circuitry has unobstructed line of sight to the viewer's second eye position.

EEE8. The wearable device of EEE7, wherein the second circuitry comprises a camera and an emitter, the camera capturing one or more reflections of the emitter from a viewer's eye, and wherein the second substrate imperceptibly matches a refractive index of the second optical component.

EEE9. A wearable device comprising:

a left view imager that renders left view display images;

a right view imager that renders right view display images;

a left view optical stack for a viewer of the wearable device to view the left view display images;

a right view optical stack for the viewer to the view right view display images;

first circuitry on a first substrate affixed in a first optical element in the left view optical stack, optionally, the first substrate configured to be substantially aligned with a viewer's left eye position; and second circuitry on a second substrate affixed in a second optical element in the right view optical stack, optionally, the second substrate configured to be substantially aligned with the viewer's right eye position;

wherein the left view device display images as viewed by the viewer through the left view imager and the right view device display images as viewed by the viewer through the right view imager form stereoscopic images, and wherein one or more of the first circuitry and the second circuitry are imperceptible by the viewer.

EEE10. The wearable device of EEE9, wherein the first circuitry has an unobstructed line of sight to a viewer's left eye.

EEE11. The wearable device of EEE9, further comprising at least one of light waveguides Fresnel lenses, and lens in the left view optical stack to bend the left view device images away from the first circuitry to achieve the imperceptibility of the first circuitry.

EEE12. The wearable device of EEE9, wherein the second circuitry has an unobstructed line of sight to a viewer's right eye.

EEE13. The wearable device of EEE9, further comprising at least one of a light waveguide, Fresnel lenses, and lens in the right view optical stack to bend the right view device images away from the second circuitry to achieve the imperceptibility of the second circuitry.

EEE14. The wearable device of EEE9, wherein light rays of the left view device images are bent away from the first circuitry in the left view optical stack.

EEE15. The wearable device of EEE9, wherein light rays of the right view device images are bent away from the second circuitry in the right view optical stack.

EEE16. The wearable device of any of EEEs 9-15 wherein the first circuitry is at least one of a camera, sensor, emitter, light emitting diode, eye tracker, and indium tin oxide material.

EEE17. The wearable device of any of EEEs 9-15, wherein the first circuitry comprises a camera and an emitter, the camera capturing one or more reflections of the emitter from a viewer eye.

EEE18. The wearable device of EEE9, wherein the first substrate is permanently affixed to the first optical stack.

EEE19. The wearable device of EEE18, wherein the first substrate is a molding material that substantially matches a refractive index of the first optical component.

EEE20. The wearable device of EEE19, wherein the molding material is at least one of silicones, polymeric organosilicon compound, organic polymer, and polydimethylsiloxane.

EEE21. The wearable device of EEE19, wherein the molding material is at least one of an epoxy, thermosetting polymer, and ultraviolet light cured epoxy.

EEE22. A wearable device comprising:

a view imager that renders images;

an optical stack for a viewer of the wearable device to view the images;

circuitry on a substrate affixed in an optical element of the optical stack, the substrate configured to be substantially aligned with a viewer's eye; and wherein the wearable device is configured such that at least one of the circuitry and the substrate is imperceptible by the viewer.

EEE23. The wearable device of EEE22, further comprising at least one of light waveguides, Fresnel lenses, and lens of the optical stack to bend the images away from the substrate to achieve the imperceptibility of the first substrate.

EEE24. The wearable device of EEE22, further comprising at least one of light waveguides, Fresnel lenses, and lens of the optical stack to bend the images away from the circuitry to achieve the imperceptibility of the circuitry.

EEE25. The wearable device of EEE22, wherein light rays of the images are bent of the optical stack away from the circuitry.

EEE26. The wearable device of EEE22, wherein light rays of the images are bent of the optical stack away from the first substrate.

EEE27. The wearable device of any of EEEs 22-26, wherein the circuitry is at least one of a sensor, emitter, light emitting diode, eye tracker, and indium tin oxide material.

EEE28. The wearable device of EEE22, wherein the substrate is permanently affixed into the optical component by a molding material.

EEE29. The wearable device of EEE28, wherein the substrate comprises a molding material that substantially matches a refractive index of the optical component.

EEE30. The wearable device of EEE29, wherein the molding material is at least one of silicones, polymeric organosilicon compound, organic polymer, and polydimethylsiloxane.

EEE31. The wearable device of EEE29, wherein the molding material is at least one of an epoxy, thermosetting polymer, and ultraviolet light cured epoxy.

EEE32. A wearable device for a viewer, the wearable device comprising:

a first view optical stack comprising one or more optical elements through which the viewer's first eye views one or more objects located at one or more distances from the viewer's first eye;

a substrate in physical contact with an optical element in the one or more optical elements of the first view optical stack, the substrate's optical refractive index matching the optical element's refractive index;

an embedded device affixed to the substrate.

EEE33. The wearable device of EEE32, wherein the substrate is in physical surface contact with the optical element over a contact surface portion, and wherein a solid angle, as covered by the contact surface portion, of the viewer's first eye is inclusive of an expected view direction of the viewer's first eye.

EEE34. The wearable device of EEE33, wherein the expected view direction of the viewer's first eye is determined as an optical axis of the first view optical stack.

EEE35. The wearable device of EEE33, wherein the embedded device is located along the expected view direction.

EEE36. The wearable device of EEE33, wherein the embedded device is located away from the expected view direction.

EEE37. The wearable device of EEE32, wherein the embedded device comprises a plurality of subcomponents distributed at a plurality of different locations of the substrate.

EEE38. The wearable device of EEE32, wherein the first view optical stack includes a light router to bend incident light, depicting the one or more objects, away from the embedded device.

EEE39. The wearable device of EEE38, wherein the light router comprises one or more of: Fresnel lenses, grating structures or light waveguides.

EEE40. The wearable device of EEE32, wherein the first view optical stack further comprises a beam splitter to redirect a part of light reflected off from the viewer's first eye toward the embedded device.

EEE41. The wearable device of EEE40, wherein the part of light reflected off from the viewer's first eye, as redirected toward the embedded device, is light invisible to the viewer.

EEE42. The wearable device of EEE40, wherein the part of light reflected off from the viewer's first eye, as redirected toward the embedded device, is originally emitted from the embedded device to illuminate the viewer's first eye.

EEE43. The wearable device of EEE32, wherein the embedded device comprises an adaptive optics actuator.

EEE44. The wearable device of EEE43, wherein the adaptive optics actuator comprises one or more piezoelectric elements to change a focal length of liquid lens.

EEE45. The wearable device of EEE42, wherein the embedded device comprises an eye tracker.

EEE46. The wearable device of EEE32, wherein the embedded device comprises one or more of: electric components, electric components, mechanical components, optical components, non-homogeneous components, discrete components, components comprising opaque parts in visible light, cameras, image sensors, CMOS image sensors, non-image sensors, LED emitters, power components, piezoelectric elements, nanowire electric connectors, ITO films, switch elements, IC circuits, electromagnetic inductive components, photovoltaic components, battery components, or other components made of materials different from the substrate.

EEE47. The wearable device of EEE32, wherein the first view optical stack comprises one or more optical elements other than the first optical element.

EEE48. The wearable device of EEE32, wherein the substrate includes a gel portion that is to be cured before the wearable device is used in operation.

EEE49. The wearable device of EEE32, wherein the substrate is made of one or more of: PDMS materials or non-PDMS materials, and wherein the substrate is optically transparent at least in one range of visible light wavelengths to the human visual system.

EEE50. A method comprising:

placing a substrate in physical contact with an optical element in one or more optical elements of a first view optical stack, the substrate's optical refractive index matching the optical element's refractive index;

affixing an embedded device to the substrate;

incorporating the first view optical stack, into a wearable device, through which a viewer's first eye views one or more objects located at one or more distances from the viewer's first eye.

EEE51. An apparatus performing the method as recited in EEE50.

EEE52. A system performing the method as recited in EEE50.

EEE53. A non-transitory computer readable storage medium, storing software instructions, which when executed by one or more processors cause performance of the method recited in EEE50.

EEE54. A computing device comprising one or more processors and one or more storage media, storing a set of instructions, which when executed by one or more processors cause performance of the method recited in EEE50.

What is claimed is:

1. A wearable device for a viewer, the wearable device comprising:

a first view optical stack comprising one or more optical elements through which the viewer's first eye views one or more objects, in front of the wearable device, located at one or more distances from the viewer's first eye;

a substrate in physical contact with an optical element in the one or more optical elements of the first view optical stack, the substrate's optical refractive index matching the optical element's refractive index to prevent optical refractive index changes between the substrate and the optical element;

an embedded device affixed to the substrate, wherein the embedded device is a non-mirror light blocking component;

wherein the embedded device comprises an eye tracker;

wherein the embedded device is located in a spatial region that light rays from an object located along an expected view direction do not reach, wherein the expected view direction represents a straight line extending from the viewer's first eye to the embedded device.

2. The wearable device of claim 1, wherein the substrate is in physical surface contact with the optical element over a contact surface portion, and wherein a solid angle, as covered by the contact surface portion, of the viewer's first eye is inclusive of the expected view direction of the viewer's first eye.

3. The wearable device of claim 2, wherein the expected view direction of the viewer's first eye is determined as an optical axis of the first view optical stack.

4. The wearable device of claim 2, wherein the embedded device is located along the expected view direction.

5. The wearable device of claim 1, wherein the embedded device comprises a plurality of subcomponents distributed at a plurality of different locations of the substrate.

6. The wearable device of claim 1, wherein the first view optical stack includes a light router to bend incident light, depicting the one or more objects, away from the embedded device.

7. The wearable device of claim 6, wherein the light router comprises one or more of: Fresnel lenses, grating structures or light waveguides.

8. The wearable device of claim 1, wherein the first view optical stack further comprises a beam splitter to redirect a part of light reflected off from the viewer's first eye toward the embedded device.

9. The wearable device of claim 8, wherein the part of light reflected off from the viewer's first eye, as redirected toward the embedded device, is light invisible to the viewer.

10. The wearable device of claim 8, wherein the part of light reflected off from the viewer's first eye, as redirected toward the embedded device, is originally emitted from the embedded device to illuminate the viewer's first eye.

11. The wearable device of claim 1, wherein the embedded device comprises an adaptive optics actuator.

12. The wearable device of claim 11, wherein the adaptive optics actuator comprises one or more piezoelectric elements to change a focal length of liquid lens.

13. The wearable device of claim 1, wherein the embedded device comprises one or more of: electric components, mechanical components, optical components, non-homogeneous components, discrete components, components comprising opaque parts in visible light, cameras, image sensors, CMOS image sensors, non-image sensors, LED emitters, power components, piezoelectric elements, nanowire electric connectors, ITO films, switch elements, IC circuits, electromagnetic inductive components, photovoltaic components, battery components, or other components made of materials different from the substrate.

14. The wearable device of claim 1, wherein the first view optical stack comprises one or more optical elements other than the optical element.

15. The wearable device of claim 1, wherein the substrate includes a gel portion that is to be cured before the wearable device is used in operation.

16. The wearable device of claim 1, wherein the substrate is made of one or more of: PDMS materials or non-PDMS materials, and wherein the substrate is optically transparent at least in one range of visible light wavelengths to the human visual system.

17. A method comprising:

placing a substrate in physical contact with an optical element in one or more optical elements of a first view optical stack, the substrate's optical refractive index matching the optical element's refractive index to prevent optical refractive index changes between the substrate and the optical element;

affixing an embedded device to the substrate, wherein the embedded device is a non-mirror light blocking component;

incorporating the first view optical stack, into a wearable device, through which a viewer's first eye views one or more objects, in front of the wearable device, located at one or more distances from the viewer's first eye;

wherein the embedded device comprises an eye tracker;

wherein the embedded device is located in a spatial region that light rays from an object located along an expected view direction do not reach, wherein the expected view direction represents a straight line extending from the viewer's first eye to the embedded device.

18. An apparatus performing the method as recited in claim 17.

19. A system performing the method as recited in claim 17.

20. A non-transitory computer readable storage medium, storing software instructions, which when executed by one or more processors cause performance of the method recited in claim 17.

21. A computing device comprising one or more processors and one or more storage media, storing a set of instructions, which when executed by one or more processors cause performance of the method recited in claim 17.

* * * * *